United States Patent
Yotsuji et al.

(10) Patent No.: US 9,450,418 B2
(45) Date of Patent: Sep. 20, 2016

(54) POWER SUPPLY DEVICE, METHOD FOR CONTROLLING THE POWER SUPPLY DEVICE, AND ELECTRONIC APPARATUS

(71) Applicant: LAPIS SEMICONDUCTOR CO., LTD., Tokyo (JP)

(72) Inventors: Tetsuaki Yotsuji, Tokyo (JP); Yasuyuki Kashu, Tokyo (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 606 days.

(21) Appl. No.: 13/691,867

(22) Filed: Dec. 3, 2012

(65) Prior Publication Data
US 2013/0147271 A1    Jun. 13, 2013

(30) Foreign Application Priority Data
Dec. 9, 2011    (JP) .................................. 2011-270197

(51) Int. Cl.
*H02J 4/00*    (2006.01)
*G06F 1/26*    (2006.01)

(52) U.S. Cl.
CPC . *H02J 4/00* (2013.01); *G06F 1/26* (2013.01); *Y10T 307/383* (2015.04); *Y10T 307/675* (2015.04)

(58) Field of Classification Search
CPC ........ H02J 4/00; G06F 1/26; Y10T 307/675; Y10T 307/383
USPC .......................................................... 307/28
See application file for complete search history.

(56) References Cited

U.S. PATENT DOCUMENTS

| | | | | |
|---|---|---|---|---|
| 5,280,455 A | * | 1/1994 | Kanaishi | G11C 5/147 307/64 |
| 5,352,935 A | * | 10/1994 | Yamamura | G05F 1/465 323/313 |
| 6,236,194 B1 | * | 5/2001 | Manabe | G05F 1/565 323/274 |
| 6,661,279 B2 | | 12/2003 | Yabe | |
| 7,049,797 B2 | | 5/2006 | Fukui et al. | |
| 8,416,012 B2 | | 4/2013 | Ashida | |
| 2002/0149036 A1 | * | 10/2002 | Yabe | H03F 1/305 257/207 |

(Continued)

FOREIGN PATENT DOCUMENTS

CN        1380696 A     11/2002
CN        101196756 A    6/2008

(Continued)

OTHER PUBLICATIONS

Chinese Office Action dated Jun. 3, 2015.
Japanese Notice of Rejection dated Nov. 4, 2015.

*Primary Examiner* — Scott Bauer
(74) *Attorney, Agent, or Firm* — Volentine & Whitt, PLLC

(57) ABSTRACT

Provided are a power supply device capable of producing a highly-accurate supply voltage at low power consumption, a method for controlling the power supply device, and an electronic apparatus in which the power supply device is incorporated. The power supply device includes a first power supplying part and a second power supplying part which has less output current capacity than the first power supplying part does. The power supply device is configured to control the voltage value of the second voltage produced in the second power supplying part in order to make the first voltage produced in the first power supplying part equal to the second voltage produced in the second power supplying part.

18 Claims, 29 Drawing Sheets

(56) References Cited

U.S. PATENT DOCUMENTS

| | | | |
|---|---|---|---|
| 2004/0155636 A1* | 8/2004 | Fukui | G05F 1/56 323/281 |
| 2005/0274982 A1* | 12/2005 | Ueda | H01L 29/8611 257/202 |
| 2007/0135866 A1* | 6/2007 | Baker | A61B 5/0002 607/60 |
| 2008/0136396 A1 | 6/2008 | Heilmann | |
| 2008/0224675 A1* | 9/2008 | Takagi | G05F 1/565 323/275 |

FOREIGN PATENT DOCUMENTS

| | | |
|---|---|---|
| CN | 101266505 A | 9/2008 |
| JP | 06-045983 A | 2/1994 |
| JP | 08-305453 A | 11/1996 |
| JP | 2002-091589 A | 3/2002 |
| JP | 2002-373942 | 12/2002 |
| JP | 2004-133800 A | 4/2004 |
| JP | 2005-234739 A | 9/2005 |
| JP | 2011-150582 A | 8/2011 |
| WO | 2009125866 A1 | 10/2009 |

* cited by examiner

POWER SUPPLY DEVICE, METHOD FOR CONTROLLING THE POWER SUPPLY DEVICE, AND ELECTRONIC APPARATUS

BACKGROUND OF THE INVENTION

1. Field of the Invention

The present invention relates to power supply devices, and more particularly, to a power supply device for producing a constant supply voltage on the basis of an externally supplied voltage, a method for controlling the power supply device, and an electronic apparatus incorporating the power supply device.

2. Background Art

Constant-voltage power supplies have been employed in electronic apparatuses, such as cellular phones, smartphones, or portable game players, which run on a small battery. Some constant-voltage power supplies have been suggested which include a first constant-voltage circuit used during a typical operating state (referred to as the active mode), for example, while a call is being made, and a second constant-voltage circuit used during a standby state (referred to as the sleep mode). See, for example, FIG. 1 of Patent Literature 1. Each of these first and second constant-voltage circuits is provided with a reference voltage generation part for producing a reference voltage as a target value of the supply voltage based on a voltage supplied from a battery, and an amplifying part for producing a supply voltage based on the reference voltage. The constant-voltage power supply may be incorporated into a device such as a cellular phone which is actually operated for a longer time in the sleep mode than in the active mode. In this case, power consumption of the aforementioned second constant-voltage circuit responsible for supplying power in the sleep mode can be reduced, thereby reducing the power consumption of the overall system.

In order to implement low power consumption, a drive current to the aforementioned second constant-voltage circuit, particularly, to the reference voltage generation part may be reduced. However, the reduction in the drive current may cause the system significantly affected by variations in the capacity of components constituting the reference voltage generation part and variations of the components' characteristics caused by temperature changes. This leads to degradation in the accuracy of the reference voltage, which will in turn raise the problem that the supply voltage produced in the sleep mode cannot be easily maintained at a desired reference voltage.

CITATION LIST

Patent Literature

PTL1: Japanese Patent Kokai No. 2002-373942

SUMMARY OF THE INVENTION

It is an object of the present invention to provide a power supply device which is reduced in power consumption and capable of producing a supply voltage with high accuracy, a method for controlling the power supply device, and an electronic apparatus which incorporates this power supply device.

According to one aspect of the present invention, a power supply device has a first power supplying part which produces a first voltage and a second power supplying part which produces a second voltage, the second power supplying part requiring less drive current than the first power supplying part. The power supply device also includes voltage control signal generation means which is capable of outputting a voltage control signal for bringing the second voltage closer to the voltage value of the first voltage, and the second power supplying part is configured to control the voltage value of the second voltage in response to the voltage control signal.

Furthermore, according to another aspect of the present invention, a method for controlling a power supply device is provided. The power supply device includes a first power supplying part which is capable of producing a first voltage and a second power supplying part which is capable of producing a second voltage and requires less drive current than the first power supplying part. The method includes providing control so that the voltage value of the second voltage is brought closer to the voltage value of the first voltage.

Furthermore, according to yet another aspect of the present invention, an electronic apparatus includes an active mode in which a first load is in an operating state and a sleep mode in which the first load is at a stopped state. The electronic apparatus has a first power supplying part and a second power supplying part. The first power supplying part produces a first voltage and supplies power to the first load while maintaining an activated state during the active mode, and stops producing the first voltage during the sleep mode and stops supplying power to the first load. The second power supplying part produces a second voltage and supplies power to a second load and requires less drive current than the first power supplying part. The electronic apparatus further includes voltage control signal generation means which is capable of outputting a voltage control signal for bringing the second voltage closer to the voltage value of the first voltage, and the second power supplying part is configured to control the voltage value of the second voltage in response to the voltage control signal.

According to still another aspect of the present invention, the power supply device is configured to provide voltage control to the second voltage so as to make the first voltage produced in the first power supplying part and the second voltage produced in the second power supplying part equal to each other wherein the second power supplying part requires less drive current than the first power supplying part. Accordingly, the voltage value of the second voltage can be brought closer to the first voltage produced in the first power supplying part which is less likely to cause voltage variations. This can be achieved even when reducing the drive current for the second power supplying part causes the second voltage to be varied due to variations in manufacture or variations in temperature or battery voltage. Thus, according to the present invention, a highly accurate supply voltage for use in the sleep mode can be produced so as to be reduced in power consumption and less likely to cause voltage variations.

DETAILED DESCRIPTION OF THE EMBODIMENTS

Disclosed herein is a power supply device which has a first power supplying part (10) and a second power supplying part (20) that requires a less drive current than the first power supplying part. The power supply device produces a voltage control signal (TO, TR) for bringing a second voltage (VLPRE, LPREG) produced in the second power supplying part closer to the voltage value of a first voltage (VREG, REG) produced in the first power supplying part and then controls the voltage value of the second voltage in response to the voltage control signal. These components will be specifically described below.

EMBODIMENTS

Figure 1:
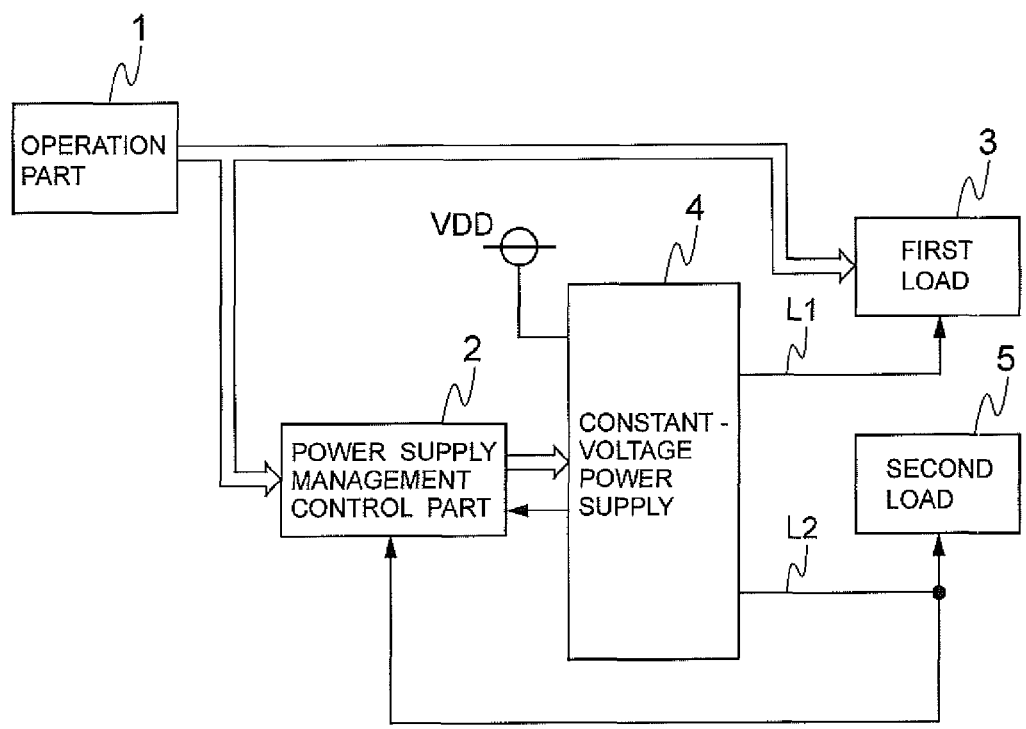
FIG. 1 is a block diagram illustrating an example of the internal configuration of an electronic apparatus into which a power supply device according to the present invention is incorporated.

FIG. 1 is a block diagram illustrating an example of the internal configuration of a battery-powered electronic apparatus into which a power supply device according to the present invention is incorporated.

In FIG. 1, an operation part 1 receives various operations from a user and then supplies various operation signals associated with those operations to each of a power supply management control part 2 and a first load 3. Note that the first load 3 is the main circuit of the electronic apparatus that operates when the electronic apparatus is in the active mode. For example, when the electronic apparatus is a portable communication device such as cellular phones or smartphones, the first load 3 is a transmit/receive circuit responsible for wireless communications.

Figure 2:
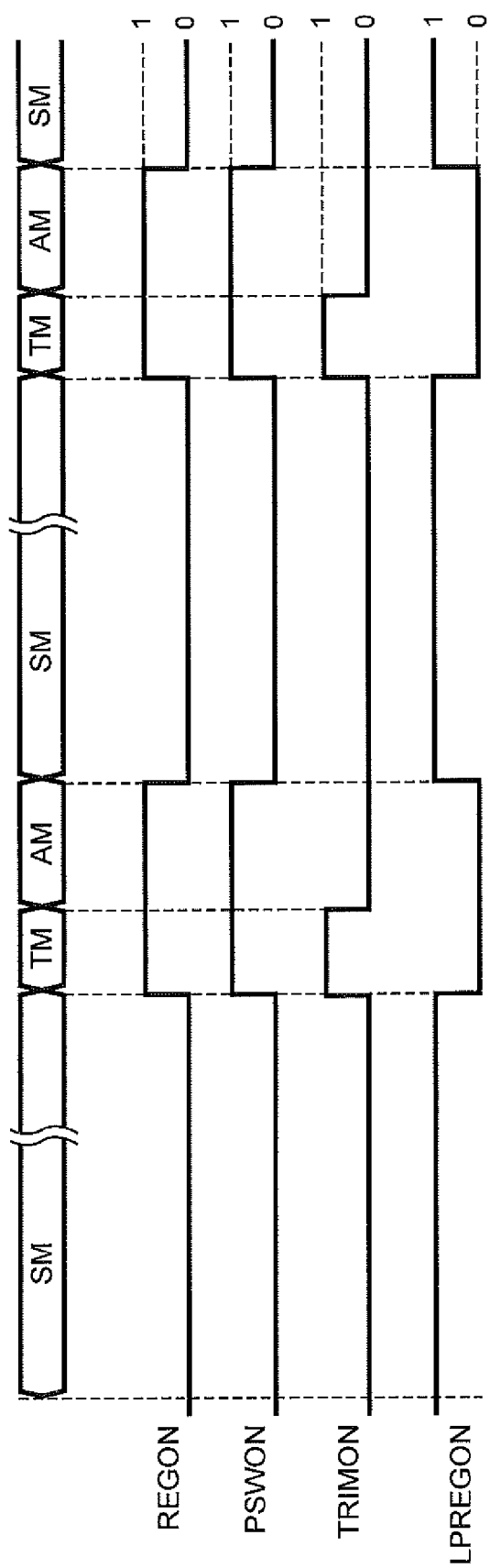
FIG. 2 is a time chart showing an example of a power-supply mode sequence in an electronic apparatus.

As shown in FIG. 2, the power supply management control part 2 produces various power supply control signals in accordance with a power-supply mode sequence in which a sleep mode, a trim mode, and an active mode are cyclically repeated. The power supply control signals include, for example, an active regulator activation signal REGON, a power supply line coupling signal PSWON, a voltage control signal TRIMON, and a sleep regulator activation signal LPREGON. As shown in FIG. 2, the cellular phone operates in the sleep mode during the period in which REGON, PSWON, and TRIMON are at logic level 0 and LPREGON is at logic level 1. In contrast, the cellular phone operates in the active mode during the period in which REGON and PSWON are at logic level 1 and TRIMON and LPREGON are at logic level 0. On the other hand, the cellular phone operates in the trim mode to control the voltage of a constant-voltage power supplying part 4 when REGON, PSWON, and TRIMON are at logic level 1 and LPREGON is at logic level 0.

Furthermore, the power supply management control part 2 produces the power supply control signal as described above when a operation signal is supplied from the operation part 1 or alternatively, in accordance with the content of the control input indicated by the operation signal. The power supply management control part 2 supplies the produced various power supply control signals (REGON, PSWON, TRIMON, and LPREGON) to the constant-voltage power supplying part 4.

The constant-voltage power supplying part 4 supplies power to the first load 3 and a second load 5 as described below. That is, in response to the aforementioned power supply control signal, the constant-voltage power supplying part 4 produces a first supply voltage REG and a second supply voltage LPREG. The first supply voltage REG is lower than the battery voltage VDD and produced on the basis of a battery voltage VDD supplied from a battery (not shown). The second supply voltage LPREG has a voltage value which is the same as or generally consistent with the first supply voltage REG, i.e., which becomes the same as the first supply voltage REG. The constant-voltage power supplying part 4 supplies the first supply voltage REG to the first load 3 through a first power supply line L1. At this time, the first load 3 is driven into an operable state as the main circuit of the electronic apparatus in response to the first supply voltage REG being supplied, and performs various operations in accordance with the operation signal supplied from the operation part 1. Note that during the sleep mode, the constant-voltage power supplying part 4 stops supplying power to the first load 3 in the aforementioned manner. Furthermore, in response to the power supply line coupling signal PSWON, the constant-voltage power supplying part 4 supplies one of the first supply voltage REG and the second supply voltage LPREG, mentioned above, to the second load 5 through a second power supply line L2. The second load 5 should be still supplied with power even during the sleep mode and includes, for example, a timer for measuring time and a circuit for processing incoming mails. The second load 5 is driven into an operable state in response to the first supply voltage REG or the second supply voltage LPREG being supplied. In this configuration, the constant-voltage power supplying part 4 supplies the aforementioned first supply voltage REG to both the first load 3 and the second load 5 in the active mode, while supplying the aforementioned second supply voltage LPREG to the second load 5 in the sleep mode. At this time, in the sleep mode, the constant-voltage power supplying part 4 supplies no power at all to the first load 3.

Figure 3:
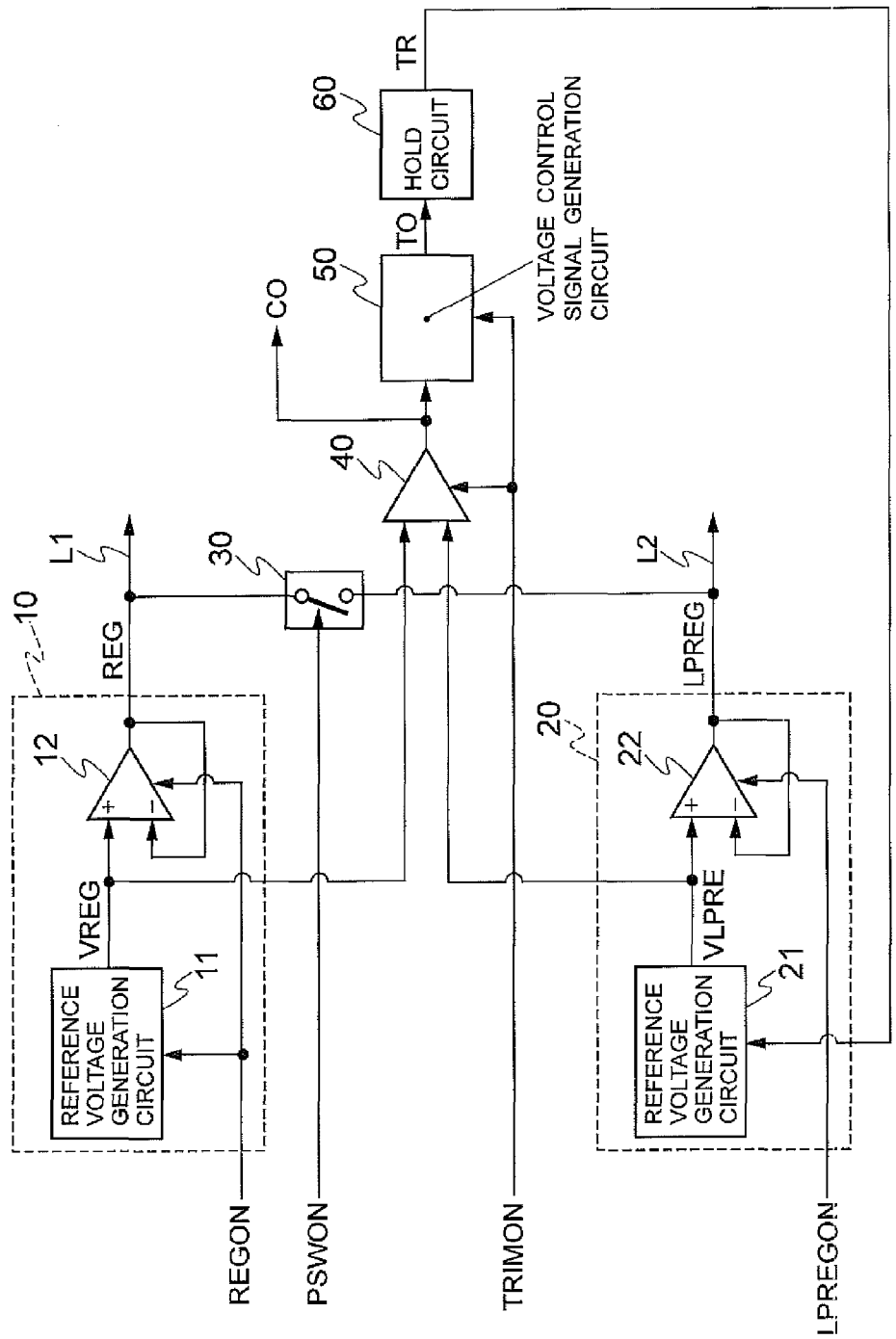
FIG. 3 is a block diagram illustrating an example of the internal configuration of a constant-voltage power supplying part 4.

FIG. 3 is a block diagram illustrating an example of the internal configuration of the constant-voltage power supplying part 4.

The constant-voltage power supplying part 4 shown in FIG. 3 includes an active regulator 10, a sleep regulator 20, a switch 30, a comparator 40, a voltage control signal generation circuit 50, and a hold circuit 60.

The active regulator 10 as a first power supplying part produces the first supply voltage REG for driving the first load 3 and the second load 5 and has a relatively large output current capacity. The active regulator 10 includes a reference voltage generation circuit 11 and an operational amplifier 12.

The reference voltage generation circuit 11 is in an activated state and produces a reference voltage based on the battery voltage VDD while the active regulator activation signal REGON is at logic level 1. The circuit 11 then supplies the reference voltage as a first reference voltage VREG (VDD>VREG) to the non-inverting input terminal of the operational amplifier 12 and the comparator 40. Note that the reference voltage generation circuit 11 is in a non-activated state and stops producing the aforementioned reference voltage while the active regulator activation signal REGON is at logic level 0.

Figure 4:
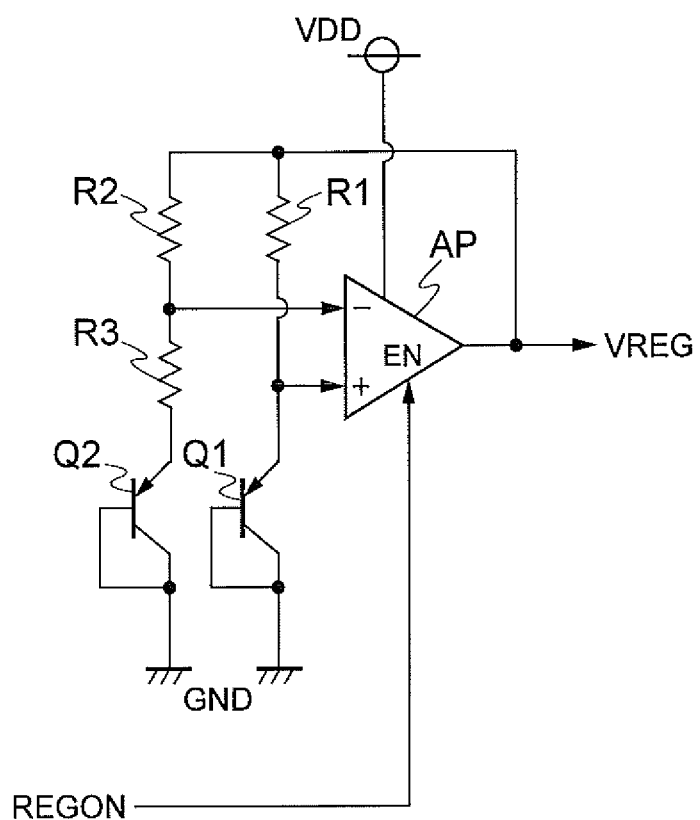
FIG. 4 is a circuit diagram illustrating an internal configuration of a reference voltage generation circuit 11.

FIG. 4 is a circuit diagram illustrating an example of the reference voltage generation circuit 11.

As shown in FIG. 4, the reference voltage generation circuit 11 includes bipolar transistors Q1 and Q2 having emitter areas that are different from each other, resistors R1 to R3, and an operational amplifier AP. At this time, a ground potential GND is applied to the collector terminal and the base terminal of the transistor Q1, with the emitter terminal connected to the non-inverting input terminal of the operational amplifier AP and one end of the resistor R1. The other end of the resistor R1 is connected to the output terminal of the operational amplifier AP. The ground potential GND is applied to the collector terminal and the base terminal of the transistor Q2, with the emitter terminal connected to one end of the resistor R3. The other end of the resistor R3 is connected with the inverting input terminal of the operational amplifier AP and one end of the resistor R2, with the other end of the resistor R2 connected to the output terminal of the operational amplifier AP. With the negative feedback circuit, the reference voltage generation circuit 11 produces the first reference voltage VREG having a temperature-independent constant voltage value and then supplies the resulting voltage to the non-inverting input terminal of the operational amplifier 12 and the comparator 40 through the output terminal. Note that the operational amplifier AP is in an activated state and produces the aforementioned first reference voltage VREG while the active regulator activation signal REGON is at logic level 1. However, while the active regulator activation signal REGON is at logic level 0, the operational amplifier AP is in a non-activated state and stops producing the first reference voltage VREG.

The operational amplifier 12 as the output amplifier of the active regulator 10 has the output terminal and the inverting input terminal connected to each other, i.e., formed in what is called a voltage follower configuration. In this configuration, the operational amplifier 12 produces a constant voltage or the first supply voltage REG having a voltage value which is the same as or generally consistent with the first reference voltage VREG supplied to the non-inverting input terminal, i.e., the same voltage value as that of the first reference voltage VREG. The operational amplifier 12 then feeds the resulting voltage to the first power supply line L1. Note that the operational amplifier 12 is in an activated state and produces the aforementioned first supply voltage REG while the active regulator activation signal REGON is at logic level 1, but is in a non-activated state and stops producing the first supply voltage REG while the active regulator activation signal REGON is at logic level 0.

As described above, in the active regulator 10, the reference voltage generation circuit 11 configured as shown in FIG. 4 produces the reference voltage value (VREG) lower than the battery voltage VDD, and on the basis of the reference voltage value, produces the first supply voltage REG to be supplied to the first load 3 during the active mode. At this time, the reference voltage generation circuit 11 allows the reference voltage value (VREG) to be produced by the operational amplifier AP that is provided with negative feedback as shown in FIG. 4. Thus, the first supply voltage REG which has a constant voltage value can be produced irrespective of changes in temperature, manufacturing variations, or variations in the battery voltage VDD.

On the other hand, the sleep regulator 20 serving as the second power supplying part produces the second supply voltage LPREG for driving at least the second load 5 that should be operated during the sleep mode. The sleep regulator 20 has a reduced output current capacity because the sleep regulator 20 is configured to require less drive current than the aforementioned active regulator 10 in order to reduce power consumption. The sleep regulator 20 has a reference voltage generation circuit 21 and an operational amplifier 22.

The reference voltage generation circuit 21 produces a reference voltage on the basis of the battery voltage VDD and supplies the reference voltage, as a second reference voltage VLPRE (VDD>VLPRE), to the non-inverting input terminal of the operational amplifier 22 and the comparator 40. Note that the second reference voltage VLPRE has a voltage value which is the same as the first reference voltage VREG produced in the reference voltage generation circuit 11 of the aforementioned active regulator 10. Note that the reference voltage generation circuit 21 controls the voltage value of the aforementioned second reference voltage VLPRE in response to a voltage control signal TR (to be described later) supplied from the hold circuit 60 (to be described later).

Figure 5:
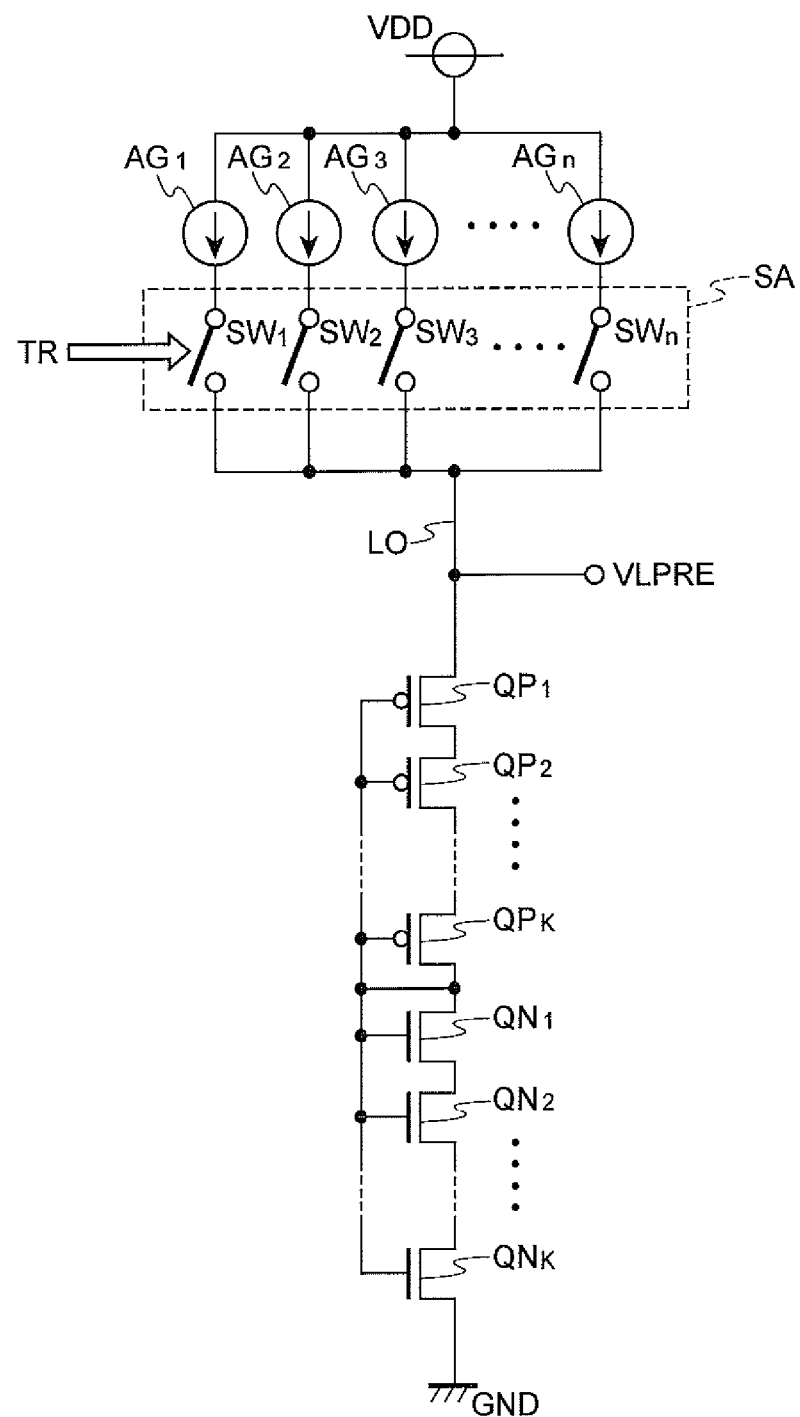
FIG. 5 is a circuit diagram illustrating an example of the internal configuration of a reference voltage generation circuit 21.

FIG. 5 is a circuit diagram illustrating an example of the reference voltage generation circuit 21.

As shown in FIG. 5, the reference voltage generation circuit 21 has current sources $AG_1$ to $AG_n$ (n is an integer equal to two or greater), a switch array SA, p-channel metal oxide semiconductor (MOS) transistors $QP_1$ to $QP_k$ (k is an integer equal to two or greater), and n-channel MOS transistors $QN_1$ to $QN_k$. The current sources $AG_1$ to $AG_n$ each produce a constant current on the basis of the battery voltage VDD and then feeds the resulting current to the switch array SA. The switch array SA includes n switch elements $SW_1$ to $SW_n$ which individually connect each of the current sources $AG_1$ to $AG_n$ to an output line LO. Note that the switch array SA changes, in response to the voltage control signal TR, the number of those of the n switch elements $SW_1$ to $SW_n$ that are set to an ON state. Thus, the greater the number of the switch elements having been set to an ON state, the greater the amount of current flowing into the transistors $QP_1$ to $QP_k$ and $QN_1$ to $QN_k$ through the output line LO becomes. This leads to an increase in the voltage on the output line LO. That is, the number of switch elements to be set to an ON state in the switch array SA is changed in response to the voltage control signal TR, whereby the voltage on the output line LO is controlled as will be described later. The output line LO is connected with the source terminal of the transistor $QP_1$. Furthermore, as shown in FIG. 5, the drain terminal of the transistor $QP_1$ is connected with the source terminal of the transistor $QP_2$, and the transistors $QP_3$ to $QP_k$ connected in series from there onward in the same manner are connected to the transistor $QP_2$. Note that the gate terminal of each of the transistors $QP_1$ to $QP_k$ and the drain terminal of $QP_k$ are connected to each other. Furthermore, the drain terminal of the transistor $QP_k$ is connected with the drain terminal of the transistor $QN_1$. Furthermore, the source terminal of the transistor $QN_1$ is connected with the drain terminal of the transistor $QN_2$, and the transistors $QN_3$ to $QN_k$ connected in series from there onward in the same manner are connected to the transistor $QN_2$. Note that the gate terminal of each of the transistors $QN_1$ to $QN_k$ and the drain terminal of $QN_1$ are connected to each other, and the potential GND is applied to the drain terminal of the transistor $QN_k$.

This configuration produces a voltage on the output line LO as the second reference voltage VLPRE, the voltage being associated with a current which flows into the transistors $QP_1$ to $QP_k$ and $QN_1$ to $QN_k$ from the current sources $AG_1$ to $AG_n$ through the switch array SA and the output line LO. At this time, the reference voltage generation circuit 21 shown in FIG. 5 can change the amount of current to be fed to the aforementioned output line LO in response to the voltage control signal TR, thereby controlling the voltage value of the second reference voltage VLPRE.

The operational amplifier 22 as the output amplifier of the sleep regulator 20 has what is called a voltage follower configuration in which the output terminal and the inverting input terminal thereof are connected to each other. In this configuration, the operational amplifier 22 produces the second supply voltage LPREG which provides a constant voltage that is to have the same voltage value as that of the second reference voltage VLPRE supplied to the non-inverting input terminal. Then, the operational amplifier 22 feeds the resulting voltage to the second power supply line L2. Note that the operational amplifier 22 is in an activated state and produces the aforementioned second supply voltage LPREG while the sleep regulator activation signal LPREGON is at logic level 1. However, while the sleep regulator activation signal LPREGON is at logic level 0, the operational amplifier 22 is in a non-activated state and stops producing the second supply voltage LPREG. On the other hand, when compared with the operational amplifier 12 of the active regulator 10, the operational amplifier 22 has a less output current capacity because of a reduction in driving current, but is reduced in power consumption by that amount.

As such, the sleep regulator 20 allows the reference voltage generation circuit 21 configured as shown in FIG. 5 to produce the reference voltage value (VLPRE) lower than the battery voltage VDD and then on the basis of that reference voltage value, produces the second supply voltage LPREG to be supplied to the second load 5 during the sleep mode. At this time, the reference voltage generation circuit 21 is configured to produce the reference voltage value (VLPRE) by the high resistance that is provided by the transistor group ($QP_1$ to $QP_k$, and $QN_1$ to $QN_k$) connected in series as shown in FIG. 5. Accordingly, when compared with the reference voltage generation circuit 11 configured as shown in FIG. 4, the reference voltage generation circuit 21 is significantly reduced in power consumption, but relatively increased in voltage variations due to changes in temperature, variations in manufacturing, or variations in the battery voltage VDD.

The switch 30 shown in FIG. 3 connects between the first power supply line L1 and the second power supply line L2 in response to the aforementioned power supply line coupling signal PSWON. The first power supply line L1 is fed with the first supply voltage REG produced by the aforementioned active regulator 10, while the second power supply line L2 is fed with the second supply voltage LPREG produced by the sleep regulator 20. That is, as shown in FIG. 2, while the power supply line coupling signal PSWON is at logic level 0, the switch 30 is in an OFF state. This causes the first power supply line L1 to serve as a transmission line dedicated to the first supply voltage REG, whereas the second power supply line L2 serves as a transmission line dedicated to the second supply voltage LPREG. On the other hand, while the power supply line coupling signal PSWON is at logic level 1, the switch 30 is in an ON state, allowing for connecting between the first power supply line L1 and the second power supply line L2. This causes the first supply voltage REG to be supplied to the first load 3 through the first power supply line L1, while also causing the first supply voltage REG to be supplied to the second load 5 through the second power supply line L2.

The comparator 40 performs a comparison as shown below only while the voltage control effecting signal TRIMON is at logic level 1, which is indicative of voltage control being provided. That is, the comparator 40 performs a magnitude comparison between the voltage value of the first reference voltage VREG produced in the reference voltage generation circuit 11 of the active regulator 10 and the voltage value of the second reference voltage VLPRE produced in the reference voltage generation circuit 21 of the sleep regulator 20. The comparator 40 then supplies a comparison result signal CO indicative of the result of the comparison to the voltage control signal generation circuit 50. For example, this comparison result signal CO has level [10] if the second reference voltage VLPRE is greater than the first reference voltage VREG, level [01] if the second reference voltage VLPRE is less than the first reference voltage VREG, and level [00] if the second reference voltage VLPRE is equal to the first reference voltage VREG.

Only while the voltage control effecting signal TRIMON is at logic level 1, the voltage control signal generation circuit 50 produces a voltage control signal TO and supplies the resulting signal to the hold circuit 60. Here, the voltage control signal TO is indicative of whether to increase or decrease the voltage value of the second reference voltage VLPRE on the basis of the aforementioned comparison result signal CO. That is, if the comparison result signal CO is at level [10], that is, the second reference voltage VLPRE is greater than the first reference voltage VREG, then the voltage control signal generation circuit 50 supplies the voltage control signal TO indicative of reducing the voltage value to the hold circuit 60. Furthermore, if the comparison result signal CO is at level [01], that is, the second reference voltage VLPRE is less than the first reference voltage VREG, then the circuit 50 supplies the voltage control signal TO indicative of increasing the voltage value to the hold circuit 60. Furthermore, if the comparison result signal CO is at level [00], that is, the second reference voltage VLPRE is equal to the first reference voltage VREG, then the circuit 50 supplies the voltage control signal TO indicative of maintaining the current control setting to the hold circuit 60.

In summary, the voltage control signal generation circuit 50 produces the voltage control signal TO to bring the voltage value of the second reference voltage VLPRE closer to the voltage value of the first reference voltage VREG.

The hold circuit 60 acquires, overwrites the previous one with, and holds the voltage control signal TO each time the voltage control signal TO is supplied from the voltage control signal generation circuit 50. Then, the hold circuit 60 supplies the voltage control signal TO being held to the reference voltage generation circuit 21 of the sleep regulator 20 as the voltage control signal TR. Note that the hold circuit 60 is supplied with the aforementioned second supply voltage LPREG produced by the sleep regulator 20 and thereby driven. This allows the hold circuit 60 to be supplied with a low supply voltage that is more stable with reduced voltage variations than the battery voltage VDD. Furthermore, the hold circuit 60 can be reduced in footprint by operating at a reduced voltage.

At this time, the reference voltage generation circuit 21 controls the voltage value of the second reference voltage VLPRE in response to the voltage control signal TR. That is, when the voltage control signal TR indicative of reducing the voltage value is supplied, the reference voltage generation circuit 21 reduces the voltage value of the second reference voltage VLPRE by one level, that is, by a predetermined certain value. For example, of the n switch elements $SW_1$ to $SW_n$ formed in the switch array SA shown in FIG. 5, one of the switch elements having already been set to an ON state is turned into an OFF state. On the other hand, when the voltage control signal TR indicative of increasing the voltage value is supplied, the reference voltage generation circuit 21 increases the voltage value of the second reference voltage VLPRE by one level, that is, by a predetermined certain value. For example, of the n switch elements formed in the switch array SA shown in FIG. 5, one of the switch elements having been set to an OFF state is turned to an ON state. Furthermore, when the voltage control signal TR indicative of maintaining the current control setting is supplied, the reference voltage generation circuit 21 fixes, for example, the ON or OFF setting state of each of the switch elements $SW_1$ to $SW_n$ in the switch array SA shown in FIG. 5, thereby maintaining the current voltage control state.

The aforementioned voltage control operation by the reference voltage generation circuit 21 is provided in a manner such that the voltage value of the second reference voltage VLPRE becomes equal to that of the first reference voltage VREG produced in the reference voltage generation circuit 11 of the active regulator 10.

Now, a description will be made below to the control operation provided by the power supply management control part 2 to the constant-voltage power supplying part 4.

First, as shown in FIG. 2, the power supply management control part 2 supplies the active regulator activation signal REGON, the power supply line coupling signal PSWON, and the voltage control effecting signal TRIMON, which are each at logic level 0, and the sleep regulator activation signal LPREGON at logic level 1 to the constant-voltage power supplying part 4 (in the sleep mode). In the sleep mode, the active regulator 10 is in a non-activated state, the switch 30 is in an OFF state, and the sleep regulator 20 is in an activated state. This causes the second load 5 to be driven into an operable state by the second supply voltage LPREG supplied from the sleep regulator 20. On the other hand, the first load 3 is brought into an operation-stopped state because the first load 3 is not supplied with the first supply voltage REG from the active regulator 10.

Each time the sleep mode is ended, the power supply management control part 2 is shifted to the trim mode.

Figure 6:
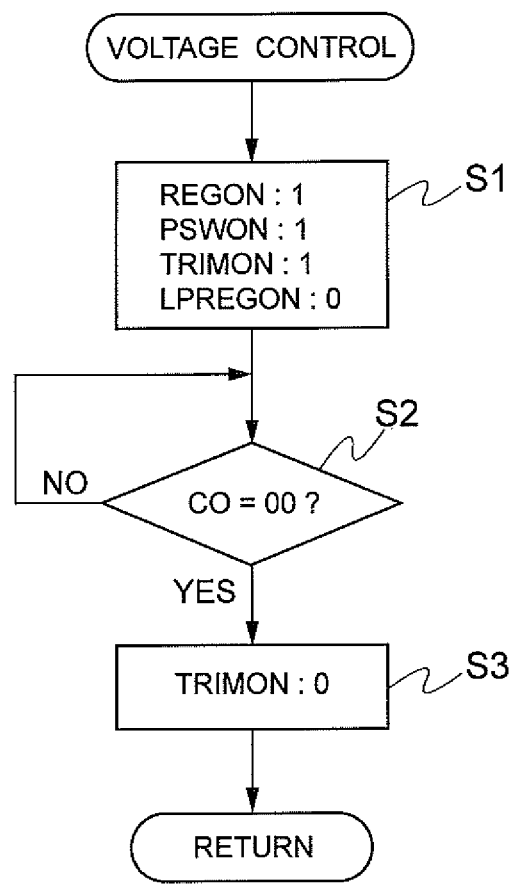
FIG. 6 is a flowchart illustrating an example of a voltage control routine.

FIG. 6 is a flowchart illustrating the voltage control routine performed by the power supply management control part 2 in the trim mode.

In FIG. 6, the power supply management control part 2 first supplies, to the constant-voltage power supplying part 4, the active regulator activation signal REGON, the power supply line coupling signal PSWON, and the voltage control effecting signal TRIMON, which each have logic level 1 as well as the sleep regulator activation signal LPREGON at logic level 0 (step S1). Performing step S1 in this manner allows the first supply voltage REG produced in the active regulator 10 to be supplied to the first load 3 through the first power supply line L1 as well as the first supply voltage REG to be supplied to the second load 5 through the second power supply line L2. That is, both the first load 3 and the second load 5 are supplied with the first supply voltage REG, thereby being driven into an operable state. Furthermore, performing step S1 allows the operational amplifier 22 of the sleep regulator 20 to be brought into a non-activated state. Meanwhile, although the sleep regulator 20 does not produce the second supply voltage LPREG, the reference voltage generation circuit 21 of the sleep regulator 20 continues to produce the second reference voltage VLPRE. Furthermore, performing step S1 allows the comparator 40 to make a magnitude comparison in voltage value between the first reference voltage VREG produced in the reference voltage generation circuit 11 of the active regulator 10 and the second reference voltage VLPRE in response to the voltage control effecting signal TRIMON at logic level 1 for executing a voltage control operation. The comparator 40 also produces the comparison result signal CO indicative of the result of the comparison.

After the aforementioned step S1 has been performed, the power supply management control part 2 repeatedly determines whether the comparison result signal CO is at level

[00], that is, the second reference voltage VLPRE is equal to the first reference voltage VREG, until the comparison result signal CO is determined to be indicative of level [00] (step S2). Meanwhile, if the comparison result signal CO indicates other than level [00], that is, level [01] or [10], then the voltage control signal generation circuit 50 and the hold circuit 60 produce the voltage control signal TR to make the voltage value of the second reference voltage VLPRE equal to the voltage value of the first reference voltage VREG. Then, in response to the voltage control signal TR, the reference voltage generation circuit 21 provides control to the second reference voltage VLPRE so as to make the voltage value of the second reference voltage VLPRE equal to the voltage value of the first reference voltage VREG.

Suppose that in step S2 above, it is determined that the comparison result signal CO is indicative of level [00], that is, the voltage value of the second reference voltage VLPRE becomes equal to the voltage value of the first reference voltage VREG. In this case, the power supply management control part 2 supplies the voltage control effecting signal TRIMON at logic level 0 for stopping the voltage control operation to the constant-voltage power supplying part 4 (step S3). Performing step S3 in this manner allows the comparator 40, the voltage control signal generation circuit 50, and the reference voltage generation circuit 21 to end the voltage control operation. After step S3 has been performed, the power supply management control part 2 is shifted to the active mode from the voltage control routine as shown in FIG. 6. In the active mode, the first supply voltage REG produced by the active regulator 10 is supplied to both the first load 3 and the second load 5.

As described above, in the aforementioned trim mode, the constant-voltage power supplying part 4 provides voltage control to the second reference voltage VLPRE on the basis of the result of a magnitude comparison between the second reference voltage VLPRE and the first reference voltage VREG. This voltage control is provided so as to make the voltage value of the second reference voltage VLPRE equal to the voltage value of the first reference voltage VREG.

The second reference voltage VLPRE may be varied due to variations in manufacturing or variations in temperature or battery voltage because of the reduced drive current required by the reference voltage generation circuit 21. Even in this case, the voltage value VLPRE is controlled to be equal to that of the first reference voltage VREG produced in the reference voltage generation circuit 11 which will be less prone to voltage variations. Accordingly, the sleep regulator 20 can produce the second supply voltage LPREG having the same voltage value as the one that is to be the first supply voltage REG produced in the active regulator 10 irrespective of variations in manufacturing or variations in temperature or battery voltage. Thus, according to the present invention, it is possible to produce a sleep-mode supply voltage (LPREG) which achieves low power consumption and high accuracy.

Furthermore, in the configuration shown in FIG. 3, voltage control is performed on the basis of the result of a magnitude comparison between the voltages on the preceding stages of the operational amplifiers (12 and 22) with the output terminals connected to the respective power supply lines (L1 and L2), that is, between the reference voltages (VREG and VLPRE). This allows for eliminating the effect of variations in the loads (3 and 5) connected to the power supply lines and thus performing control with high accuracy. Furthermore, when compared with the case where the comparator 40 performs a magnitude comparison between the outputs from the operational amplifiers (12 and 22), that is, the supply voltages (REG and LPREG), the configuration shown in FIG. 3 can obtain the result of the magnitude comparison without waiting for the processing time of the operational amplifiers. This allows for reducing the time required to execute the trim mode.

Furthermore, as shown in FIG. 2, since the trim mode for performing the voltage control as described above is to be executed successively after the active mode, the active regulator 10 has to be started only once during such a series of processing. Accordingly, since the active regulator 10 is started to operate less often when compared with the case where the sleep mode is executed between the trim mode and the active mode, power consumption can be reduced. Furthermore, the trim mode can be executed immediately before the active mode, whereby voltage control can be ended before the first load 3 to which the active regulator 10 supplies power is actually started to operate. At this time, since the reference voltage generation circuit 11 operates more stably before than after the first load 3 is started to operate, the voltage control can be performed with improved accuracy.

Note that in the aforementioned embodiment, it is determined in step S2 whether the comparison result signal CO is indicative of level [00], that is, whether the voltage value of the second reference voltage VLPRE is consistent with the voltage value of the first reference voltage VREG. However, it is not necessary to determine whether both the reference voltages (VLPRE, VREG) are completely consistent with each other. For example, suppose that the voltage value of the second reference voltage VLPRE becomes higher and lower, immediately after that, than the voltage value of the first reference voltage VREG, or the voltage value of the second reference voltage VLPRE becomes lower and higher, immediately after that, than the voltage value of the first reference voltage VREG. In this case, the process may move on to the next step S3. In summary, the process may move on to the next step S3 when it is determined in step S2 that the voltage value of the second reference voltage VLPRE is consistent with the voltage value of the first reference voltage VREG or falls within a predetermined range including the voltage value of the first reference voltage VREG.

Furthermore, in the embodiment shown in FIG. 3, the voltage value of the second reference voltage VLPRE is controlled in response to the voltage control signal TR produced by the comparator 40, the voltage control signal generation circuit 50, and the hold circuit 60. However, the functions of the comparator 40, the voltage control signal generation circuit 50, and the hold circuit 60 may also be achieved by software processing in the power supply management control part 2.

Figure 7:
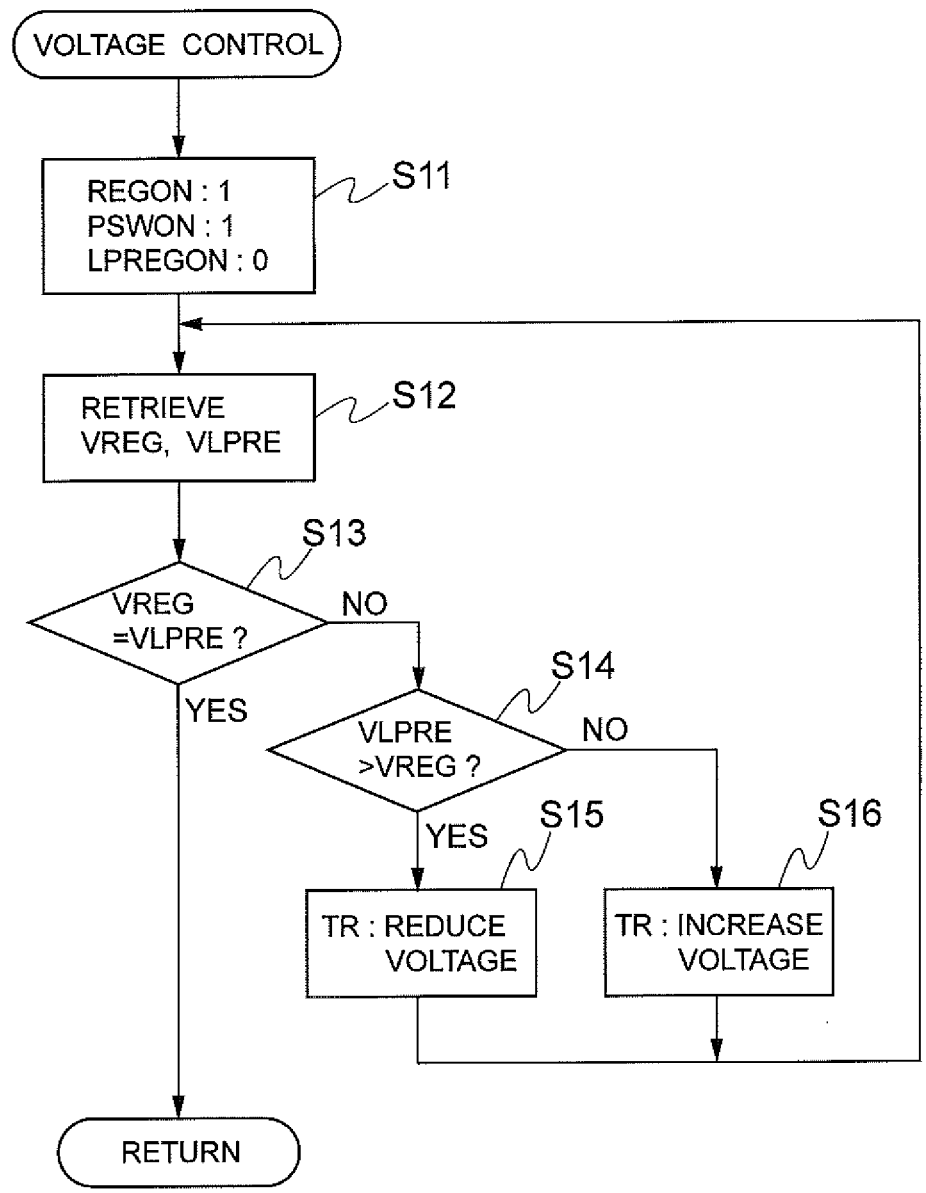
FIG. 7 is a flowchart illustrating another example of a voltage control routine.

FIG. 7 is a flowchart illustrating another example of a voltage control routine developed in view of the aforementioned point.

In FIG. 7, first, the power supply management control part 2 supplies the active regulator activation signal REGON and the power supply line coupling signal PSWON, which each have logic level 1, and the sleep regulator activation signal LPREGON having logic level 0 to the constant-voltage power supplying part 4 (step S11). Performing step S11 in this manner allows the first supply voltage REG produced in the active regulator 10 to be supplied to the first load 3 through the first power supply line L1 as well as the first supply voltage REG to be supplied to the second load 5 through the second power supply line L2. That is, both the first load 3 and the second load 5 are supplied with the first supply voltage REG, thereby being driven into an operable state. Furthermore, performing step S11 allows the operational amplifier 22 of the sleep regulator 20 to be brought into a non-activated state.

Next, the power supply management control part 2 retrieves the first reference voltage VREG produced in the reference voltage generation circuit 11 and the second reference voltage VLPRE produced in the reference voltage generation circuit 21 (step S12). Then, the power supply management control part 2 determines whether the voltage value of the second reference voltage VLPRE is equal to the voltage value of the first reference voltage VREG (step S13). If it is determined in step S13 that the voltage value of the second reference voltage VLPRE is different from the voltage value of the first reference voltage VREG, then the power supply management control part 2 determines whether the second reference voltage VLPRE is greater than the first reference voltage VREG (step S14). If it is determined in step S14 that the second reference voltage VLPRE is greater than the first reference voltage VREG, then the power supply management control part 2 supplies the voltage control signal TR indicative of reducing the voltage value to the reference voltage generation circuit 21 (step S15). Performing step S15 allows the reference voltage generation circuit 21 to reduce the voltage value of the second reference voltage VLPRE by one level, that is, by a predetermined certain value. Furthermore, if it is determined in the aforementioned step S14 that the second reference voltage VLPRE is less than the first reference voltage VREG, then the power supply management control part 2 supplies the voltage control signal TR indicative of increasing the voltage value to the reference voltage generation circuit 21 (step S16). Performing step S16 allows the reference voltage generation circuit 21 to increase the voltage value of the second reference voltage VLPRE by one level, that is, by a predetermined certain value. After the aforementioned step S15 or S16 has been performed, the power supply management control part 2 moves back to the aforementioned step S12 so as to repeatedly execute the operations as described above. That is, until it is determined in step S13 that the voltage value of the second reference voltage VLPRE is equal to the voltage value of the first reference voltage VREG, the process repeatedly executes the control operation of reducing or increasing the voltage in step S15 or S16. Here, if it is determined in step S13 that the voltage value of the second reference voltage VLPRE is equal to the voltage value of the first reference voltage VREG, then the power supply management control part 2 exits the voltage control routine shown in FIG. 7 so as to be shifted to the active mode.

On the other hand, in the aforementioned embodiment, the power supply management control part 2 executes the voltage control routine as shown in FIG. 6 or FIG. 7 each time the sleep mode is ended, thereby controlling the voltage of the second reference voltage VLPRE; however, the routine is not normally executed each time the sleep mode is ended. For example, after one sleep mode is ended every N sleep modes (N is an integer equal to two or greater), the voltage control as described above may be performed. Alternatively, depending on the frequency at which the trim mode is performed in a predetermined duration, the voltage control may be either executed or not executed after the sleep mode is ended. That is, when the frequency of the trim mode is low, then the voltage control may be executed after the sleep mode is ended, whereas when the frequency of the trim mode is high, then the voltage control may not be executed.

Furthermore, in the aforementioned embodiment, as the voltage control state of the reference voltage generation circuit 21 at the start of voltage control (for example, the ON/OFF state of each of the switch elements $SW_1$ to $SW_n$ shown in FIG. 5), the final state in the previous voltage control is maintained as it is. However, the voltage control state may be reset to a predetermined initial status each time the voltage control is started. For example, each time the voltage control is started, the voltage control state may be set to an initial status in which n/2 of the n switch elements $SW_1$ to $SW_n$ as shown in FIG. 5 may be set to an ON state and the remaining n/2 to an OFF state.

Furthermore, in the embodiment shown in FIG. 2, during the active mode and the trim mode, the power supply management control part 2 supplies the sleep regulator activation signal LPREGON at logic level 0 to the constant-voltage power supplying part 4, thereby allowing the sleep regulator 20 to be in a non-activated state. However, if setting the sleep regulator 20 to an activated state in conjunction with the active regulator 10 causes no problem, then the sleep regulator 20 may also be set to an activated state together with the active regulator 10 during the active mode and the trim mode. At this time, the power supply management control part 2 may supply the power supply line coupling signal PSWON at logic level 0 to the constant-voltage power supplying part 4, thereby breaking the connection between the first power supply line L1 and the second power supply line L2. Furthermore, during the active mode, if supplying power only from the sleep regulator 20 allows the second load 5 to be normally operated, then the sleep regulator 20 may be set to an activated state while the connection between the first power supply line L1 and the second power supply line L2 is interrupted. Then, the second supply voltage LPREG produced in the sleep regulator 20 may be supplied as power to the second load 5.

Furthermore, the configuration shown in FIG. 1 allows power to be supplied from the constant-voltage power supplying part 4 to the first load 3 and the second load 5 each individually through the two independent power supply lines (L1 and L2). However, power may also be supplied to each of the first load 3 and the second load 5 through a single power supply line.

Figure 8:
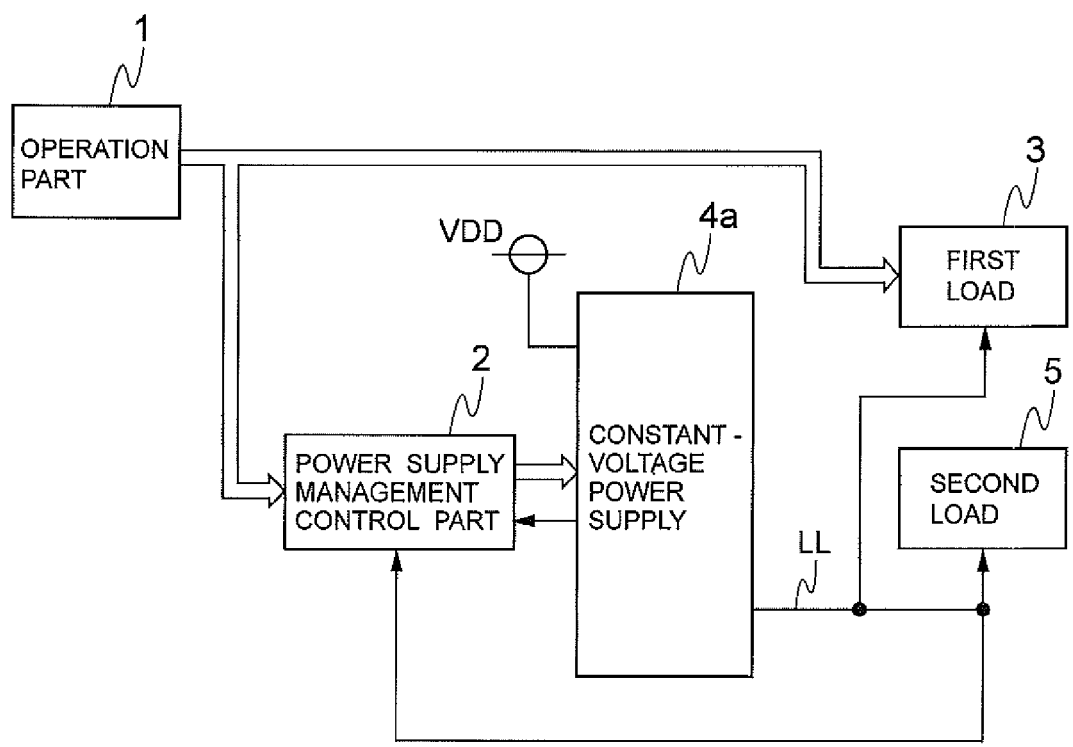
FIG. 8 is a block diagram illustrating another example of the internal configuration of an electronic apparatus.

FIG. 8 is a block diagram illustrating one modified example of the system configuration shown in FIG. 1 and developed in view of the aforementioned point.

Note that the configuration shown in FIG. 8 is the same as that shown in FIG. 1 except that the constant-voltage power supplying part 4 is replaced with a constant-voltage power supplying part 4a. Thus, the supply voltage (REG, LPREG) produced in the constant-voltage power supplying part 4a is supplied as power to both the first load 3 and the second load 5 through the single power supply line LL.

Figure 9:
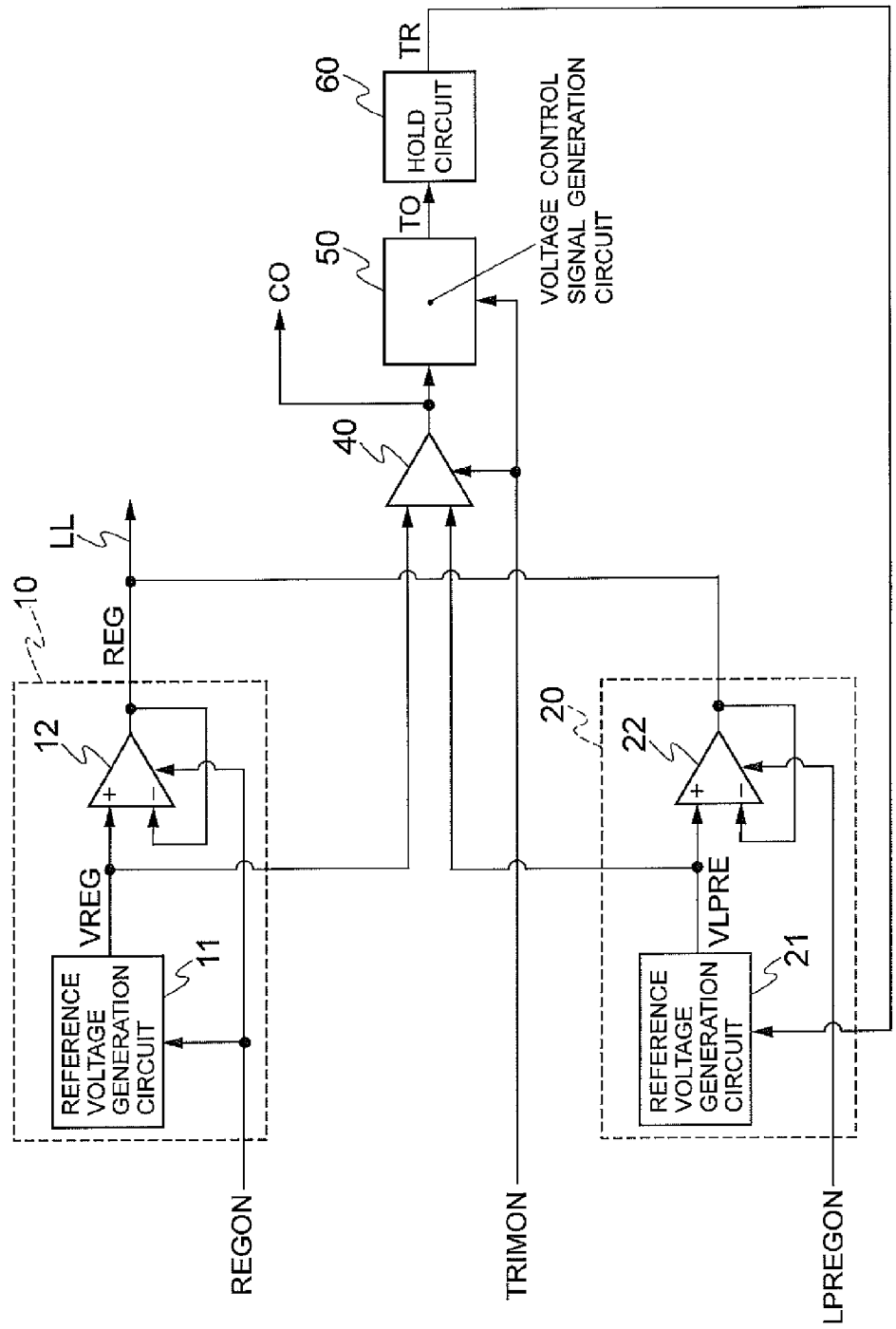
FIG. 9 is a block diagram illustrating an example of the internal configuration of a constant-voltage power supplying part 4a shown in FIG. 8.

FIG. 9 is a block diagram illustrating an example of the internal configuration of the aforementioned constant-voltage power supplying part 4a.

Note that the configuration shown in FIG. 9 is the same as that shown in FIG. 3 except that the switch 30 is eliminated and the output terminals of the operational amplifier 12 and 22 are connected to each other on the single power supply line LL.

According to the configurations shown in FIG. 8 and FIG. 9, the scale of the entire system is reduced by the amount that the power supply line coupling signal PSWON and the switch 30 are no longer required.

Furthermore, in the constant-voltage power supplying part 4 shown in FIG. 3, activation/deactivation control is provided only to the operational amplifier 22 of the sleep regulator 20 in response to the sleep regulator activation signal LPREGON. However, activation/deactivation control may also be provided to the reference voltage generation circuit 21 of the sleep regulator 20 and the hold circuit 60.

Figure 10:
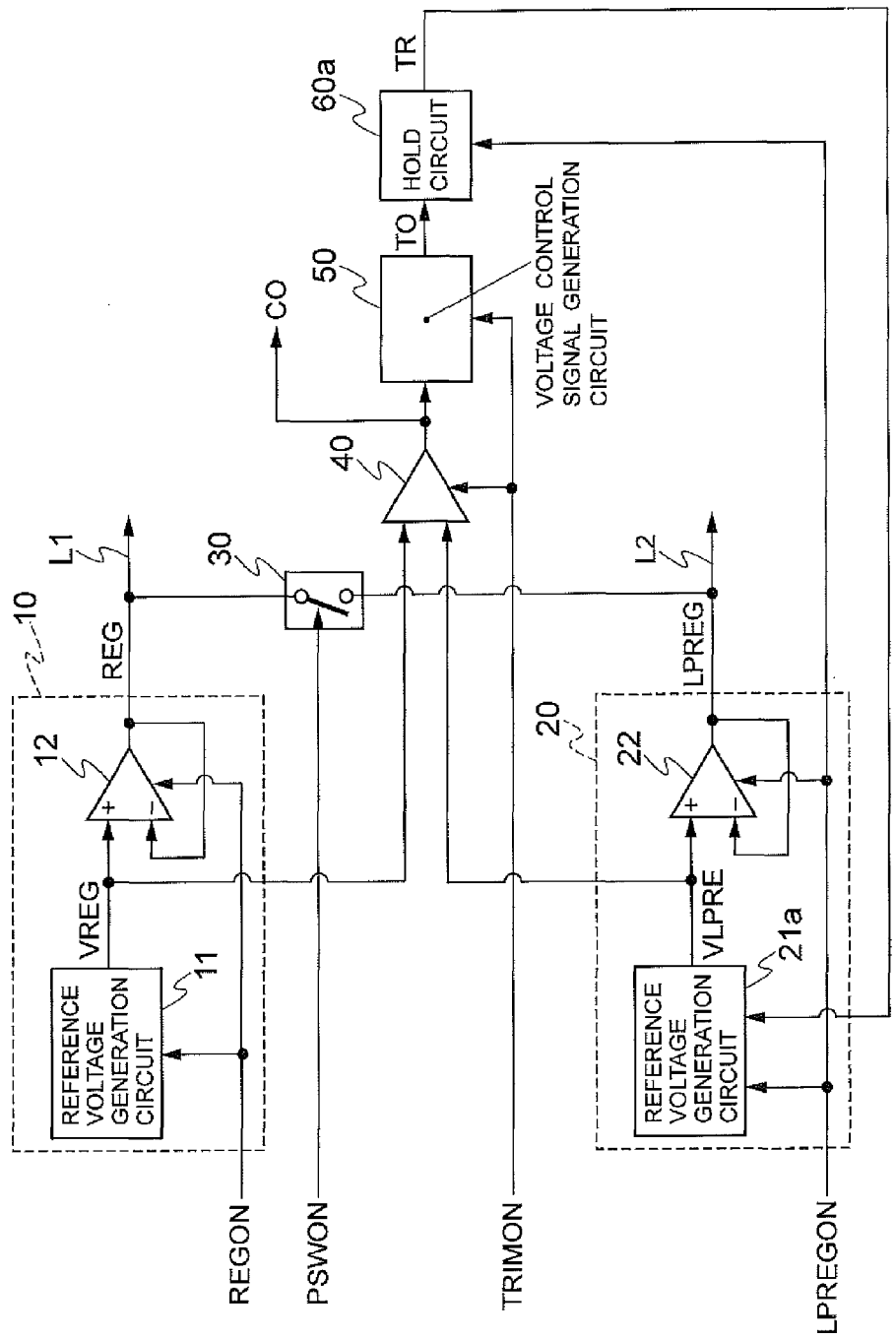
FIG. 10 is a block diagram illustrating a modified example of the constant-voltage power supplying part 4 shown in FIG. 3.

FIG. 10 is a block diagram illustrating a modified example of the constant-voltage power supplying part 4 shown in FIG. 3 and developed in view of the aforementioned point.

Note that the configuration shown in FIG. 10 is the same as that shown in FIG. 3 except that the reference voltage generation circuit 21a is employed in place of the reference voltage generation circuit 21 and the hold circuit 60a is employed in place of the hold circuit 60.

In FIG. 10, while the sleep regulator activation signal LPREGON is at logic level 1, the reference voltage generation circuit 21a is in an activated state and produces the second reference voltage VLPRE like the reference voltage generation circuit 21. On the other hand, while the sleep regulator activation signal LPREGON is at logic level 0, the reference voltage generation circuit 21a is in a non-activated state and stops producing the second reference voltage VLPRE. While the sleep regulator activation signal LPREGON is at logic level 1, the hold circuit 60a is in an activated state and acquires and holds by overwriting the voltage control signal TO supplied from the voltage control signal generation circuit 50. The hold circuit 60a then supplies the voltage control signal TO being held to the reference voltage generation circuit 21a as the voltage control signal TR. On the other hand, while the sleep regulator activation signal LPREGON is at logic level 0, the hold circuit 60a is in a non-activated state and stops capturing the aforementioned voltage control signal TO.

Figure 11:
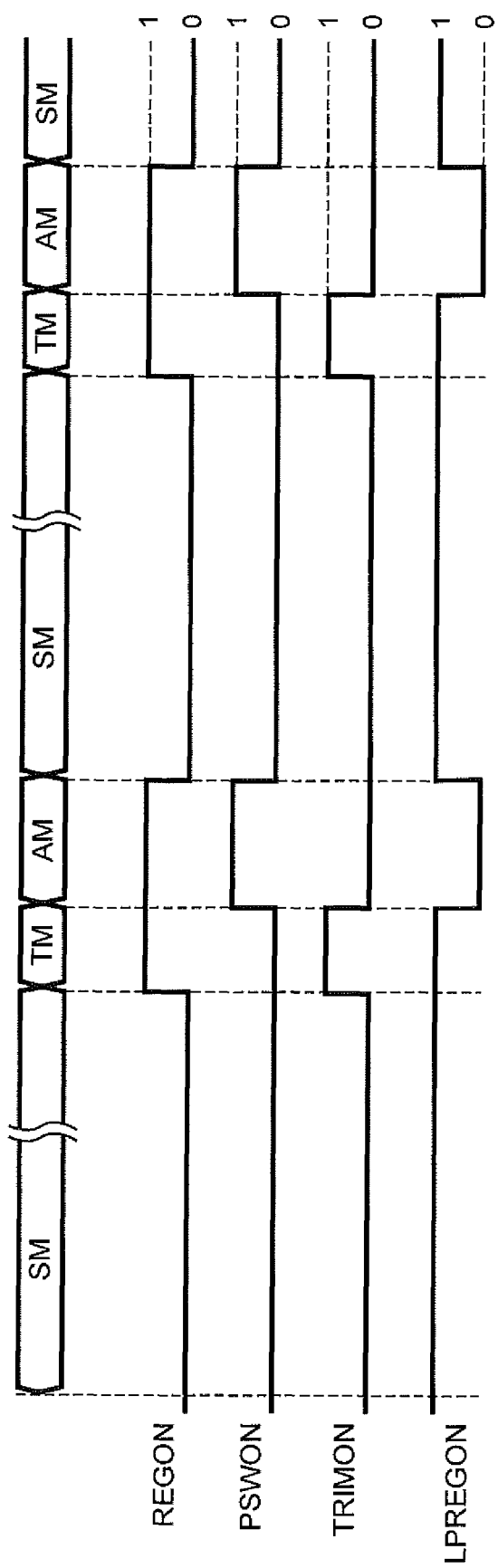
FIG. 11 is a time chart showing another example of a power-supply mode sequence in an electronic apparatus.

Here, in the trim mode, the second reference voltage VLPRE produced in the reference voltage generation circuit 21a has to be supplied to the comparator 40. Thus, with the constant-voltage power supplying part 4 configured as shown in FIG. 10, the power supply management control part 2 turns the sleep regulator activation signal LPREGON to logic level 1 in the trim mode as shown in FIG. 11. Accordingly, in the trim mode, in response to the sleep regulator activation signal LPREGON at logic level 1, the sleep regulator 20 feeds the second supply voltage LPREG to the second power supply line L2. Thus, the switch 30 in an ON state causes the first supply voltage REG and the second supply voltage LPREG to be superimposed on the first power supply line L1, possibly leading to variations in the voltage REG. In this context, as shown in FIG. 11, in the trim mode, the power supply management control part 2 sets the switch 30 to an OFF state by supplying the power supply line coupling signal PSWON at logic level 0 thereto. Note that the fact that the output current capacity of the sleep regulator 20 is significantly lower than that of the active regulator 10 is substantially the same as that only the active regulator 10 supplies power, so that the switch 30 may be set to an ON state.

Furthermore, with the constant-voltage power supplying part 4 configured as shown in FIG. 3, when the second load 5 is resistant to power supply variations, the sleep regulator 20 may be normally placed in an activated state.

Figure 12:
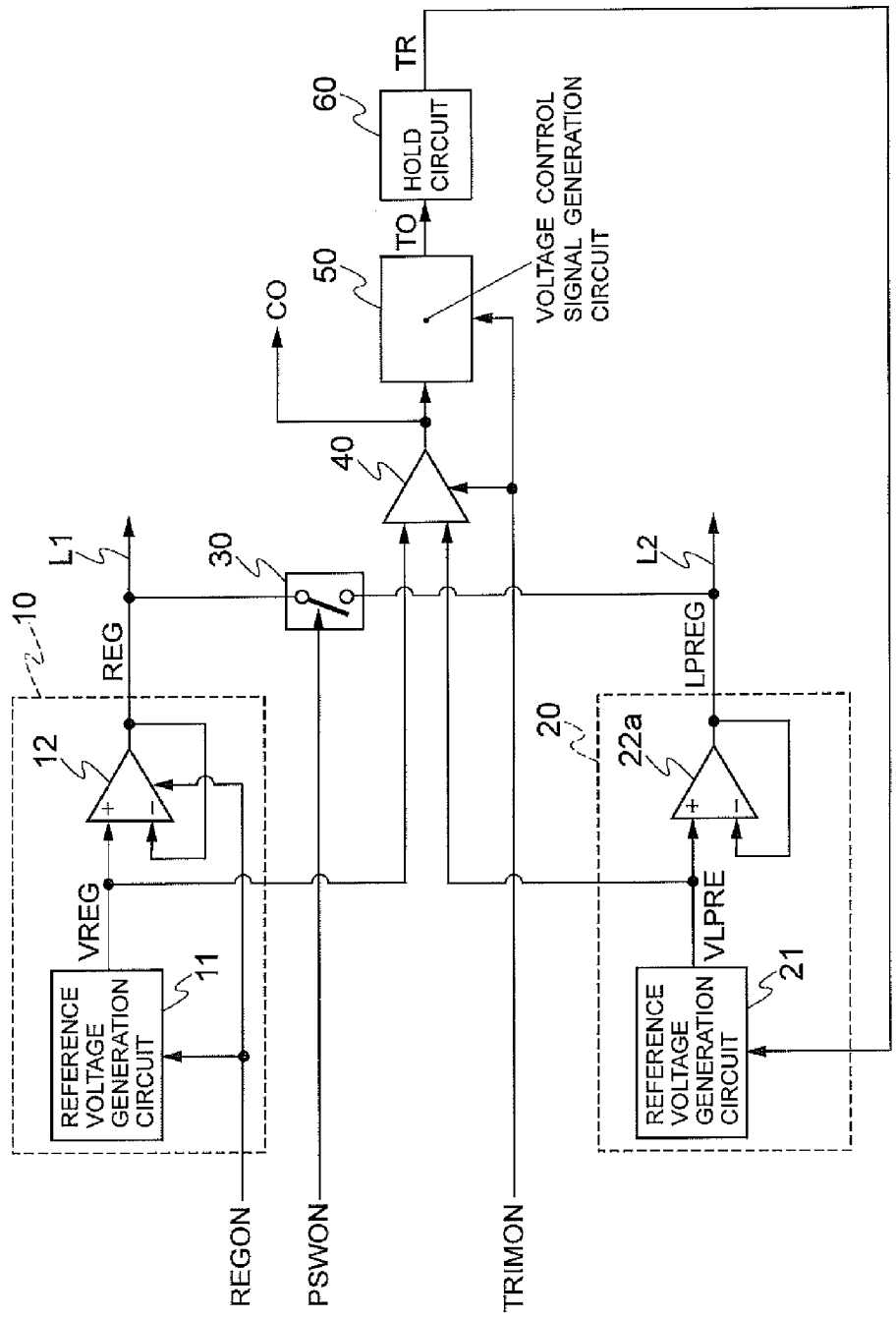
FIG. 12 is a block diagram illustrating a modified example of the constant-voltage power supplying part 4 shown in FIG. 3.

FIG. 12 is a block diagram illustrating a modified example of the constant-voltage power supplying part 4 shown in FIG. 3 and developed in view of the aforementioned point.

Note that the configuration shown in FIG. 12 is the same as that shown in FIG. 3 except that the operational amplifier 22a of the sleep regulator 20 is not subjected to control by the sleep regulator activation signal LPREGON for providing activation/deactivation control.

Figure 13:
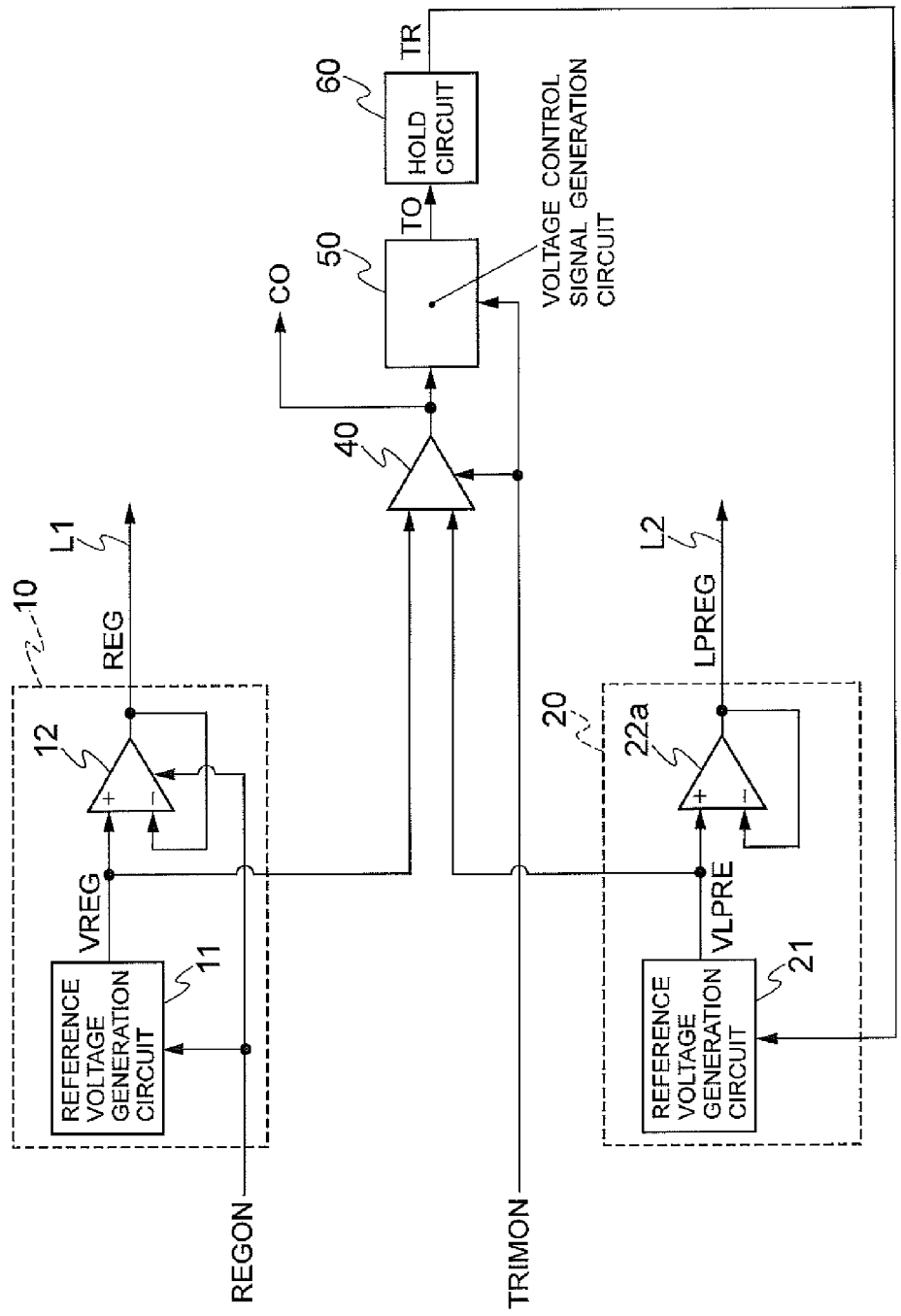
FIG. 13 is a block diagram illustrating a modified example of the constant-voltage power supplying part 4 shown in FIG. 3.

With the constant-voltage power supplying part 4 configured as shown in FIG. 12, the sleep regulator 20 is normally in an activated state. Thus, in the active mode and the trim mode, the first supply voltage REG and the second supply voltage LPREG are superimposed on the first power supply line L1 and the second power supply line L2. In this context, in the active mode and the trim mode, the power supply management control part 2 supplies the power supply line coupling signal PSWON at logic level 0 to the constant-voltage power supplying part 4 configured as shown in FIG. 12. This turns the switch 30 to an OFF state, causing the power supply path (L1) of the active regulator 10 and the power supply path (L2) of the sleep regulator 20 to be isolated from each other. Here, the fact that the output current capacity of the sleep regulator 20 is significantly lower than that of the active regulator 10 is substantially the same as that only the active regulator 10 supplies power. Accordingly, in this case, the switch 30 may be set to an ON state. Furthermore, the second load 5 may be operated in a normal condition with the power supplied only from the sleep regulator 20 in the active mode. In this case, the switch 30 may be fixed to an OFF state, or alternatively as shown in FIG. 13, the switch 30 may be eliminated so that each of the first power supply line L1 and the second power supply line L2 is normally in an independent state.

Furthermore, in the configurations shown in FIG. 3, FIG. 9, FIG. 10, FIG. 12, or FIG. 13, the comparator 40 makes a magnitude comparison between the first reference voltage VREG and the second reference voltage VLPRE. However, the voltage to be subjected to the magnitude comparison is not limited to the first reference voltage VREG and the second reference voltage VLPRE.

Figure 14:
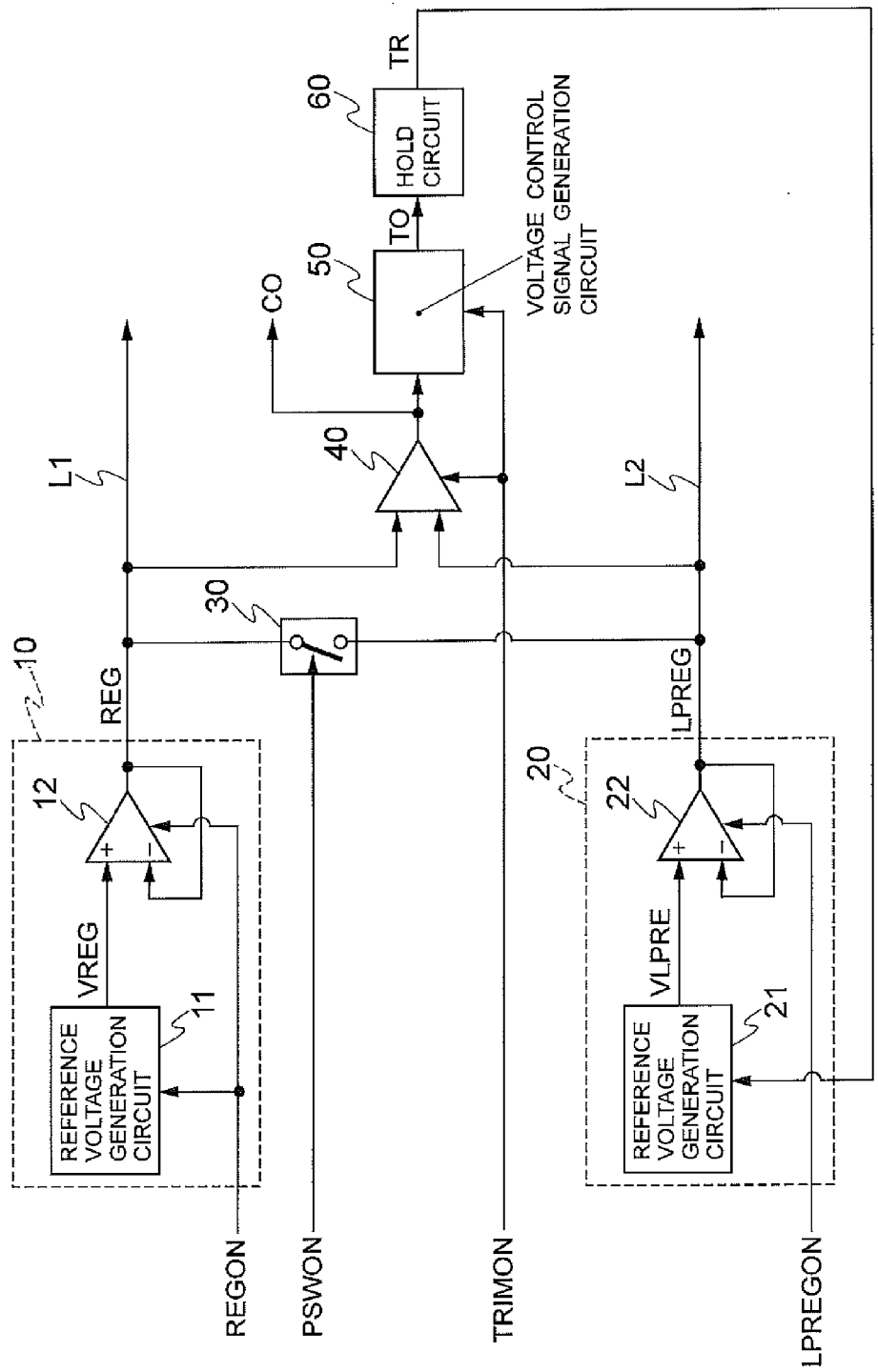
FIG. 14 is a block diagram illustrating another example of the constant-voltage power supplying part 4 shown in FIG. 3.

FIG. 14 is a block diagram illustrating another example of the internal configuration of the constant-voltage power supplying part 4 developed in view of the aforementioned point.

Note that the configuration shown in FIG. 14 is the same as that shown in FIG. 3 except that the comparator 40 performs a magnitude comparison between the first supply voltage REG and the second supply voltage LPREG instead of the first reference voltage VREG and the second reference voltage VLPRE.

That is, in FIG. 14, the comparator 40 performs the comparison as shown below only while the voltage control effecting signal TRIMON is at logic level 1 which is indicative of executing a voltage control operation. That is, the comparator 40 performs a magnitude comparison between the voltage value of the first supply voltage REG fed from the active regulator 10 and the voltage value of the second supply voltage LPREG fed from the sleep regulator 20. Then, the comparator 40 supplies the comparison result signal CO indicative of the result of the comparison to the voltage control signal generation circuit 50. For example, this comparison result signal CO has level [10] when the second supply voltage LPREG is greater than the first supply voltage REG, level [01] when the second supply voltage LPREG is less than the first supply voltage REG, and level [00] when the second supply voltage LPREG is equal to the first supply voltage REG.

Suppose that the constant-voltage power supplying part 4 configured as shown in FIG. 14 is employed. In this case, the constant-voltage power supplying part 4 is supplied, in the sleep mode as shown in FIG. 11, by the power supply management control part 2 with the active regulator activation signal REGON, the power supply line coupling signal PSWON, and the voltage control effecting signal TRIMON, which are each at logic level 0. The constant-voltage power supplying part 4 is also supplied with the sleep regulator activation signal LPREGON at logic level 1. Thus, in the sleep mode, the second supply voltage LPREG produced in the sleep regulator 20 is supplied to the second load 5 through the second power supply line L2. Note that since the active regulator 10 is brought into a non-activated state in the sleep mode, no power is supplied to the first load 3.

When the sleep mode is ended, the power supply management control part 2 is shifted to the trim mode as shown below. In the trim mode, as shown in FIG. 11, the power supply management control part 2 first supplies REGON at logic level 1, PSWON at logic level 0, TRIMON at logic level 1, and LPREGON at logic level 1 to the constant-voltage power supplying part 4. This allows the active regulator 10 to be in an activated state in the trim mode, so that the first supply voltage REG produced in the active regulator 10 is supplied to the first load 3 through the first power supply line L1. Furthermore, in the trim mode, the second supply voltage LPREG produced in the sleep regulator 20 is supplied to the second load 5 through the second power supply line L2. This allows the comparator 40 to perform a magnitude comparison between the second supply voltage LPREG and the first supply voltage REG, and then supply the comparison result signal CO associated with the result of the magnitude comparison to the voltage control signal generation circuit 50. Accordingly, the voltage control signal (TO, TR) indicative of reducing or increasing the voltage on the basis of the comparison result signal CO is produced by the voltage control signal generation circuit 50 and the hold circuit 60. Then, in response to the voltage control signal, the reference voltage generation circuit 21 controls the voltage value of the second reference voltage VLPRE.

In summary, voltage control is provided in the trim mode to the second reference voltage VLPRE so as to make the voltage value of the second supply voltage LPREG equal to that of the first supply voltage REG on the basis of the result of the magnitude comparison between the second supply voltage LPREG and the first supply voltage REG.

Here, the aforementioned comparison result signal CO may show that the second supply voltage LPREG and the first supply voltage REG are consistent or generally consistent with each other. In this case, as shown in FIG. 11, the power supply management control part 2 turns the power supply line coupling signal PSWON from logic level 0 to logic level 1, while turning the voltage control effecting signal TRIMON and the sleep regulator activation signal LPREGON from logic level 1 to logic level 0. This causes the switch 30 to be in an ON state to connect between the first power supply line L1 and the second power supply line L2, so that the operational amplifier 22, the comparator 40, and the voltage control signal generation circuit 50 are brought into a non-activated state. Then, the trim mode for providing voltage control is ended, and the process is shifted to the active mode. In the active mode, the first supply voltage REG produced in the active regulator 10 is supplied to both the first load 3 and the second load 5.

As described above, in the configuration shown in FIG. 14, voltage control is provided in the trim mode to the second reference voltage VLPRE so as to make the voltage value of the second supply voltage LPREG equal to the voltage value of the first supply voltage REG. Here, the voltage control is performed on the basis of the result of a magnitude comparison between the second supply voltage LPREG and the first supply voltage REG.

This allows the voltage value of LPREG to be controlled so as to be equal to that of the first supply voltage REG. This is achieved even when the second supply voltage LPREG is varied due to variations in manufacturing or variations in temperature or battery voltage because of the use of the reference voltage generation circuit 21 that is reduced in drive current. Accordingly, the sleep regulator 20 can produce the second supply voltage LPREG, which has a voltage value that is to be the same as that of the first supply voltage REG produced in the active regulator 10, irrespective of variations in manufacturing or variations in temperature or battery voltage.

Accordingly, the constant-voltage power supplying part 4 that is configured as shown in FIG. 14 in the same manner as shown in FIG. 3 makes it possible to produce the sleep-mode supply voltage (LPREG) which achieves low power consumption and high accuracy.

Furthermore, in the configuration shown in FIG. 14, the sleep regulator 20 provides voltage control on the basis of the result of a magnitude comparison between the outputs from each of the operational amplifiers (12, 22) of the respective regulators (10, 20), that is, between the supply voltages (REG, LPREG). Thus, it is also possible to provide control over offset occurring in the operational amplifiers. This allows for providing voltage control with higher accuracy in consideration of the offset error of each operational amplifier when compared with the case where the sleep regulator 20 performs voltage control based on the result of a magnitude comparison between the voltages on the preceding stages of the operational amplifiers (12, 22), that is, the reference voltages (VREG, VLPRE).

Note that during the active mode in the configuration shown in FIG. 14, the power supply management control part 2 supplies the sleep regulator activation signal LPREGON at logic level 0 to the constant-voltage power supplying part 4, thereby allowing the sleep regulator 20 to be in a non-activated state. However, if setting the sleep regulator 20 to an activated state in conjunction with the active regulator 10 causes no problem, then the sleep regulator 20 may be set to an activated state together with the active regulator 10 during the active mode and the trim mode. At this time, the power supply management control part 2 may supply the power supply line coupling signal PSWON at logic level 0 to the constant-voltage power supplying part 4, thereby interrupting the connection between the first power supply line L1 and the second power supply line L2. Furthermore, during the active mode, with the connection between the first power supply line L1 and the second power supply line L2 interrupted, the sleep regulator 20 may be set to an activated state, and then the second supply voltage LPREG produced in the sleep regulator 20 may be supplied to the second load 5.

Furthermore, the constant-voltage power supplying part 4 shown in FIG. 14 provides activation/deactivation control only to the operational amplifier 22 of the sleep regulator 20 in response to the sleep regulator activation signal LPREGON. However, activation/deactivation control may also be provided to the reference voltage generation circuit 21 of the sleep regulator 20 and the hold circuit 60.

Figure 15:
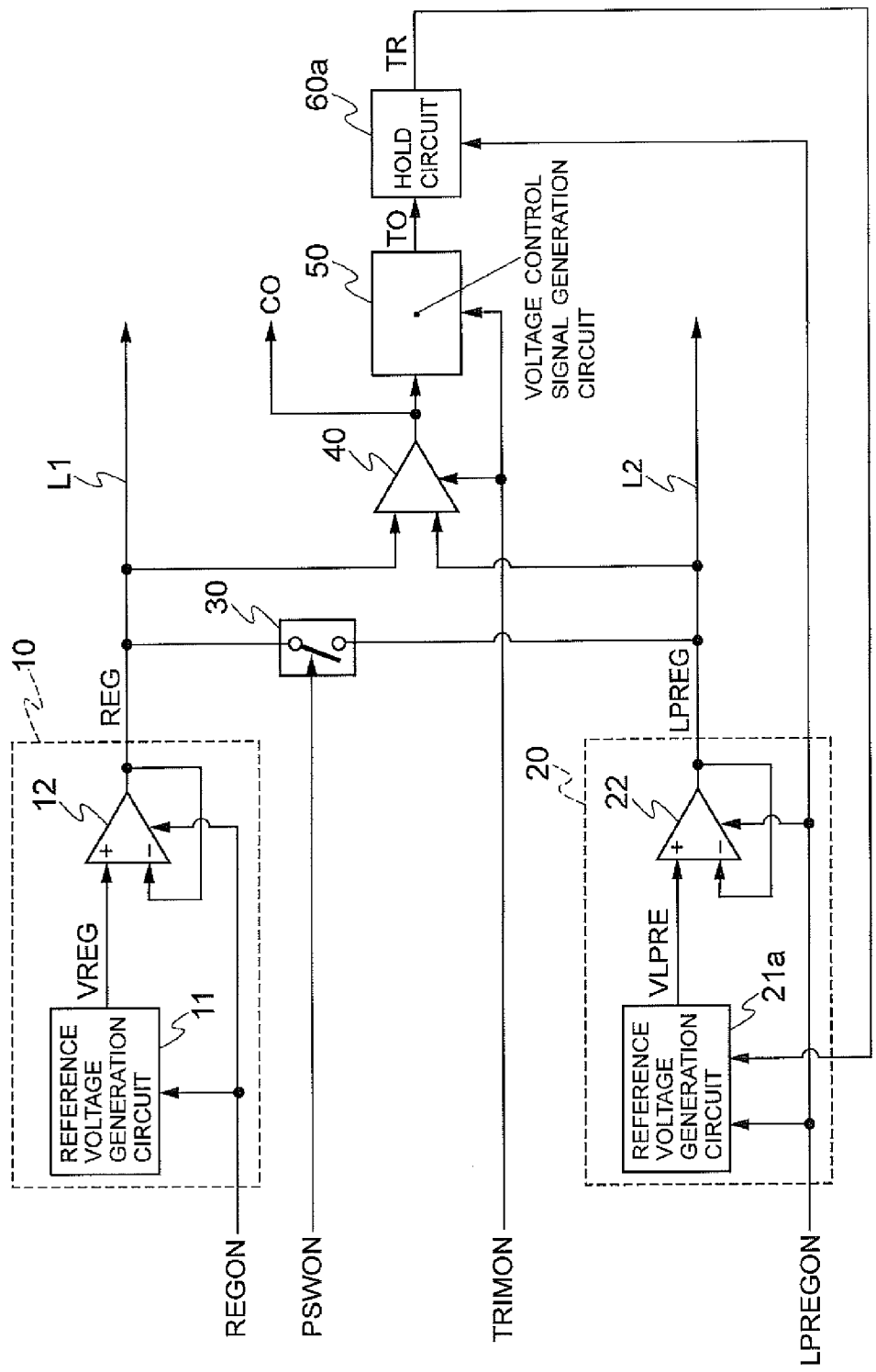
FIG. 15 is a block diagram illustrating a modified example of the constant-voltage power supplying part 4 shown in FIG. 14.

FIG. 15 is a block diagram illustrating a modified example of the constant-voltage power supplying part 4 shown in FIG. 14 and developed in view of the aforementioned point.

The configuration shown in FIG. 15 is the same as that shown in FIG. 14 except that the reference voltage generation circuit 21a is employed in place of the reference voltage generation circuit 21 and the hold circuit 60a is employed in place of the hold circuit 60.

In FIG. 15, while the sleep regulator activation signal LPREGON is at logic level 1, the reference voltage generation circuit 21*a* is in an activated state and produces the second reference voltage VLPRE in the same manner as the reference voltage generation circuit 21 does. On the other hand, while the sleep regulator activation signal LPREGON is at logic level 0, the reference voltage generation circuit 21*a* is in a non-activated state and stops producing the second reference voltage VLPRE. While the sleep regulator activation signal LPREGON is at logic level 1, the hold circuit 60*a* is in an activated state and acquires and holds by overwriting the voltage control signal TO supplied from the voltage control signal generation circuit 50. The hold circuit 60*a* then supplies the voltage control signal TO being held to the reference voltage generation circuit 21*a* as the voltage control signal TR. On the other hand, while the sleep regulator activation signal LPREGON is at logic level 0, the hold circuit 60*a* is in a non-activated state and stops capturing the aforementioned voltage control signal TO.

Furthermore, with the constant-voltage power supplying part 4 configured as shown in FIG. 14, the sleep regulator 20 may be normally placed in an activated state when the second load 5 to which power is supplied during the sleep mode is resistant to power supply variations.

Figure 16:
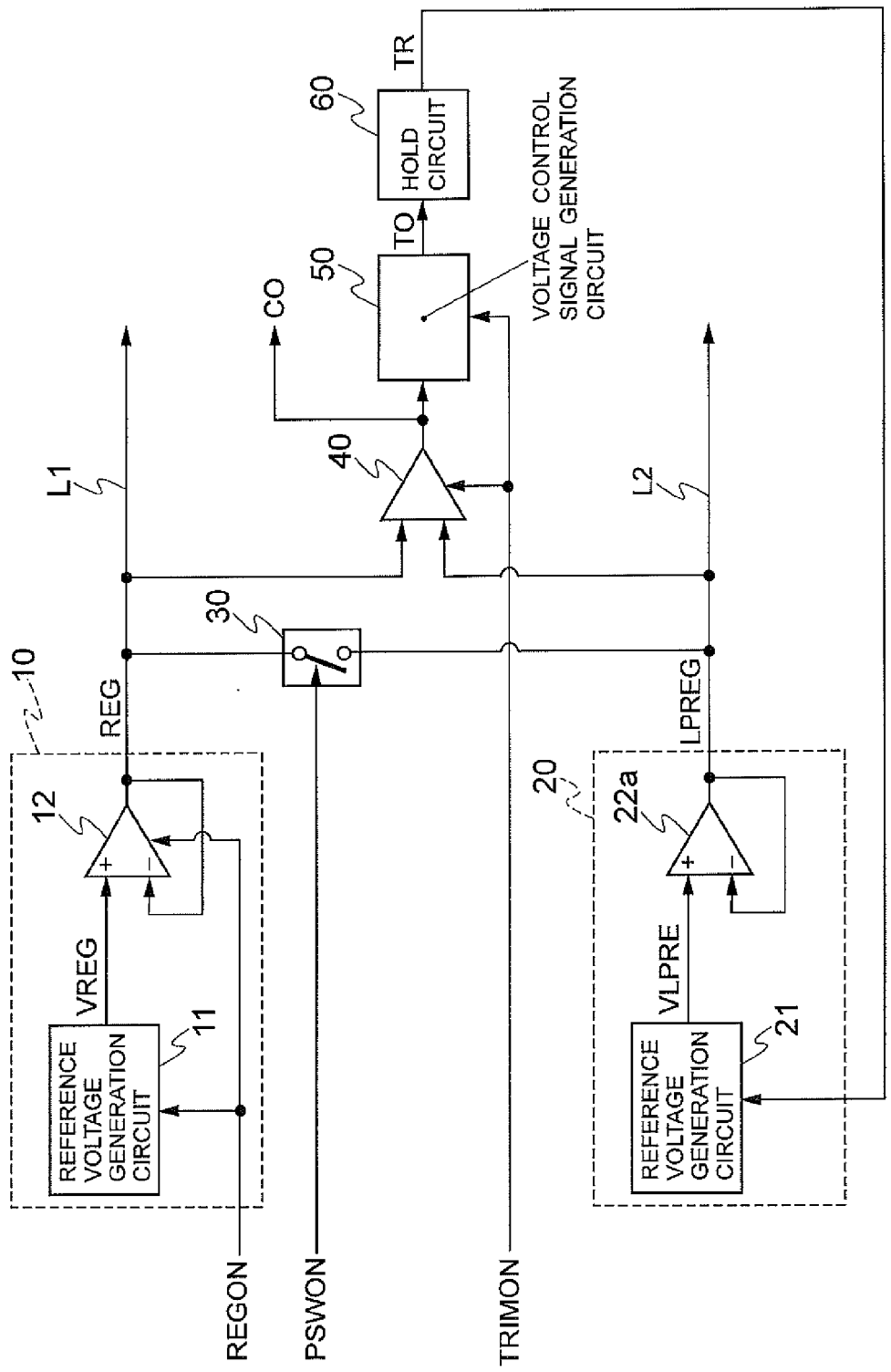
FIG. 16 is a block diagram illustrating a modified example of the constant-voltage power supplying part 4 shown in FIG. 14.
Figure 17:
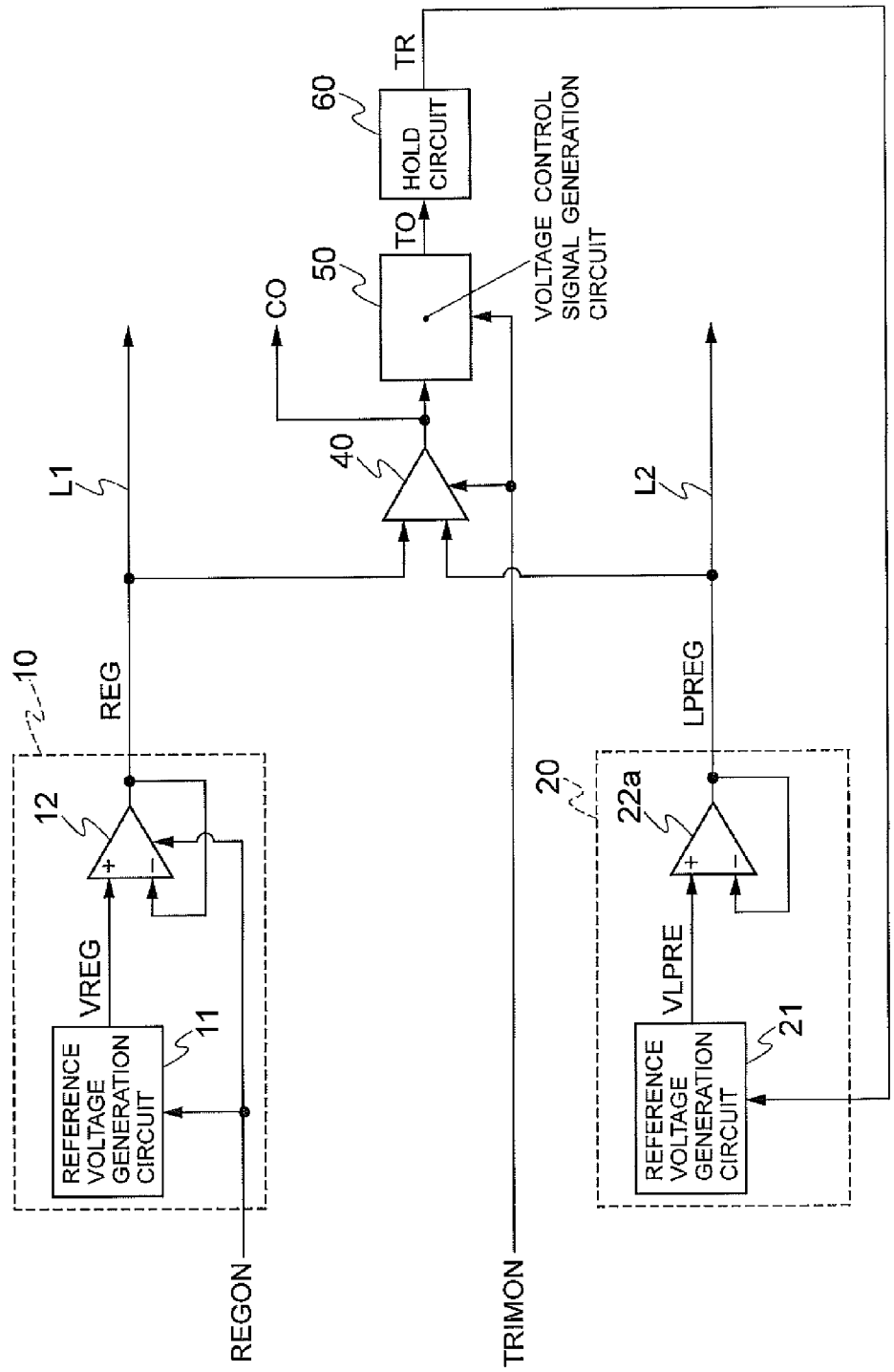
FIG. 17 is a block diagram illustrating a modified example of the constant-voltage power supplying part 4 shown in FIG. 14.

FIG. 16 is a block diagram illustrating a modified example of the constant-voltage power supplying part 4 shown in FIG. 14 developed in view of the aforementioned point.

Note that the configuration shown in FIG. 16 is the same as that shown in FIG. 14 except that the operational amplifier 22*a* of the sleep regulator 20 is not subjected to control by the sleep regulator activation signal LPREGON for providing activation/deactivation control.

With the constant-voltage power supplying part 4 configured as shown in FIG. 16, the sleep regulator 20 is normally in an activated state. Thus, in the active mode shown in FIG. 11, the first supply voltage REG and the second supply voltage LPREG are superimposed on the first power supply line L1 and the second power supply line L2. In the trim mode, the power supply management control part 2 supplies the power supply line coupling signal PSWON at logic level 0 as shown in FIG. 11 to the constant-voltage power supplying part 4. Thus, the switch 30 is placed in an OFF state, thereby causing the power supply path (L1) of the active regulator 10 and the power supply path (L2) of the sleep regulator 20 to be isolated from each other. At this time, in the active mode, the switch 30 may be set to an ON state so as to short-circuit the power supply path (L1) and the power supply path (L2). Furthermore, if the second load 5 operates in a normal condition with the power supplied only from the sleep regulator 20 in the active mode, the switch 30 may be fixed to an OFF state. Or alternatively as shown in FIG. 13, the switch 30 may be eliminated so that each of the first power supply line L1 and the second power supply line L2 is normally in an independent state.

Furthermore, in the configurations shown in FIG. 14 to FIG. 17, the comparator 40 makes a magnitude comparison between the first supply voltage REG and the second supply voltage LPREG. However, the comparator 40 may also make a magnitude comparison between the first supply voltage REG and the second reference voltage VLPRE or alternatively between the first reference voltage VREG and the second supply voltage LPREG.

Figure 18:
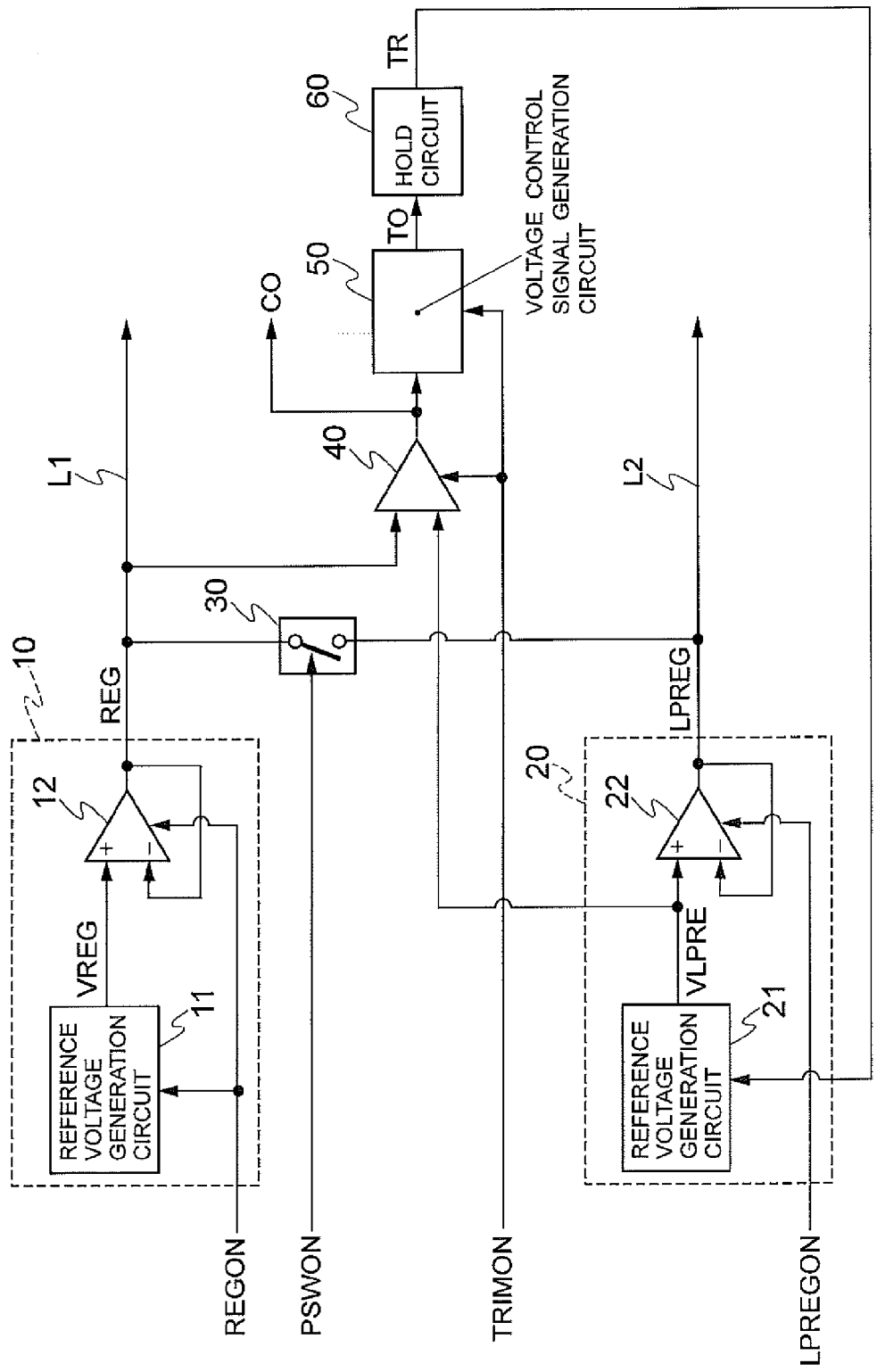
FIG. 18 is a block diagram illustrating another example of the constant-voltage power supplying part 4 shown in FIG. 3.

FIG. 18 is a block diagram illustrating a modified example of the constant-voltage power supplying part 4 shown in FIG. 14 and developed in view of the aforementioned point.

Note that the configuration shown in FIG. 18 is the same as that shown in FIG. 14 except that the second reference voltage VLPRE is employed in place of the second supply voltage LPREG as the sleep regulator voltage to be subjected to the magnitude comparison made by the comparator 40.

However, to the constant-voltage power supplying part 4 configured as shown in FIG. 18, the power supply management control part 2 supplies the active regulator activation signal REGON, the power supply line coupling signal PSWON, the voltage control effecting signal TRIMON, and the sleep regulator activation signal LPREGON in accordance with the power supply mode sequence shown in FIG. 2.

In the sleep mode, this allows the second supply voltage LPREG produced in the sleep regulator 20 to be supplied to the second load 5 through the second power supply line L2. Note that since the active regulator 10 is brought into a non-activated state in the sleep mode, no power is supplied to the first load 3.

When the sleep mode is ended, the power supply management control part 2 is shifted to the trim mode as shown below. In the trim mode, as shown in FIG. 2, the power supply management control part 2 first supplies REGON, PSWON, and TRIMON, which are each at logic level 1, and LPREGON at logic level 0 to the constant-voltage power supplying part 4. In the trim mode, this allows the active regulator 10 to be in an activated state and the first supply voltage REG produced in the active regulator 10 to be fed to the first power supply line L1 and the second power supply line L2. Note that although the operational amplifier 22 of the sleep regulator 20 is in a non-activated state in the trim mode, the reference voltage generation circuit 21 of the sleep regulator 20 continues to produce the second reference voltage VLPRE. This allows the comparator 40 to perform a magnitude comparison between the second reference voltage VLPRE and the first supply voltage REG and then supplies the comparison result signal CO associated with the result of the magnitude comparison to the voltage control signal generation circuit 50. Accordingly, on the basis of the comparison result signal CO, the voltage control signal generation circuit 50 and the hold circuit 60 produce the voltage control signal (TO, TR) indicative of reducing or increasing the voltage. Then, in response to the voltage control signal, the reference voltage generation circuit 21 controls the voltage value of the second reference voltage VLPRE.

In summary, voltage control is provided in the trim mode to the second reference voltage VLPRE so as to make the voltage value of the second supply voltage LPREG equal to that of the first supply voltage REG on the basis of the result of the magnitude comparison between the second reference voltage VLPRE and the first supply voltage REG.

Here, as shown in FIG. 2, the power supply management control part 2 turns the voltage control effecting signal TRIMON from logic level 1 to logic level 0 when the aforementioned comparison result signal CO shows that the second reference voltage VLPRE and the first supply voltage REG are consistent or generally consistent with each other. This causes the trim mode for voltage control to be ended, and the process is shifted to the active mode. In the active mode, the first supply voltage REG produced by the active regulator 10 is supplied to both the first load 3 and the second load 5.

As described above, the configuration shown in FIG. 18 is adapted such that in the trim mode, voltage control is provided to the second reference voltage VLPRE so as to make the voltage value of the second supply voltage LPREG equal to the voltage value of the first supply voltage REG. This voltage control is performed on the basis of the result of the magnitude comparison between the second reference voltage VLPRE produced in the reference voltage generation circuit 21 and the first supply voltage REG.

This allows the voltage value of VLPRE to be controlled to be equal to that of the first supply voltage REG even when the second reference voltage VLPRE is varied due to variations in manufacturing or variations in temperature or battery voltage because of the use of the reference voltage generation circuit 21 that is reduced in drive current. Accordingly, the sleep regulator 20 can produce the second supply voltage LPREG, which has a voltage value that is to be the same as that of the first supply voltage REG produced in the active regulator 10, irrespective of variations in manufacturing or variations in temperature or battery voltage.

Accordingly, the constant-voltage power supplying part 4 that is configured as shown in FIG. 18 in the same manner as shown in FIG. 14 makes it possible to produce the sleep-mode supply voltage (LPREG) which achieves low power consumption and high accuracy.

Furthermore, in the configuration shown in FIG. 18, the second reference voltage VLPRE produced in the reference voltage generation circuit 21 is employed as the voltage produced on the sleep regulator 20 side so that the comparator 40 performs a magnitude comparison between the voltage produced in the active regulator 10 and the voltage produced in the sleep regulator 20. This allows the comparator 40 to perform a magnitude comparison without the intervention of the operational amplifier 22 that has a reduced output current capacity and thereby requires a relatively increased time for voltage convergence when control is conducted. Thus, this configuration makes it possible to reduce the time required to execute the trim mode when compared with the configuration shown in FIG. 14. Furthermore, in the configuration shown in FIG. 18, for the comparator 40 to perform a magnitude comparison between the voltages produced in each regulator (10, 20), the first supply voltage REG produced in the operational amplifier 12 is to be employed as the voltage produced on the active regulator 10 side. This allows for providing voltage control in consideration of the offset error of the operational amplifier 12.

Figure 19:
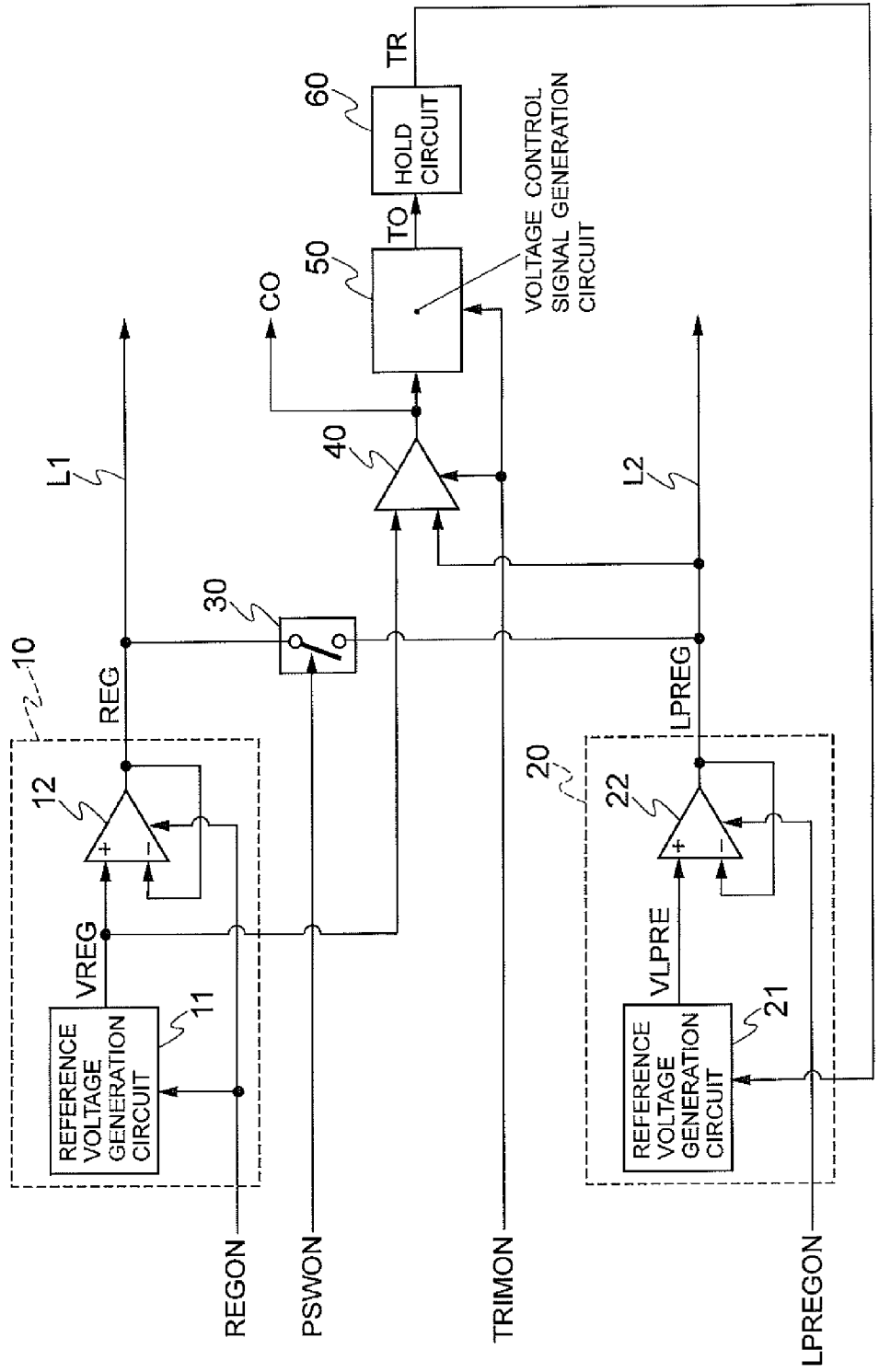
FIG. 19 is a block diagram illustrating another example of the constant-voltage power supplying part 4 shown in FIG. 3.

FIG. 19 is a block diagram illustrating a modified example of the constant-voltage power supplying part 4 shown in FIG. 18.

The configuration shown in FIG. 19 is the same as that shown in FIG. 18 except that the comparator 40 makes a magnitude comparison between the first reference voltage VREG produced in the reference voltage generation circuit 11 of the active regulator 10 and the second supply voltage LPREG delivered from the operational amplifier 22 of the sleep regulator 20. Here, the first load 3 to which the first supply voltage REG is supplied may be subjected to a relatively large amount of noise, which may be superimposed on the power supply line L1. However, the configuration shown in FIG. 19 is more resistant to noise than the configuration shown in FIG. 18 because noise would never reach the comparator 40 through the power supply line L1.

Figure 20:
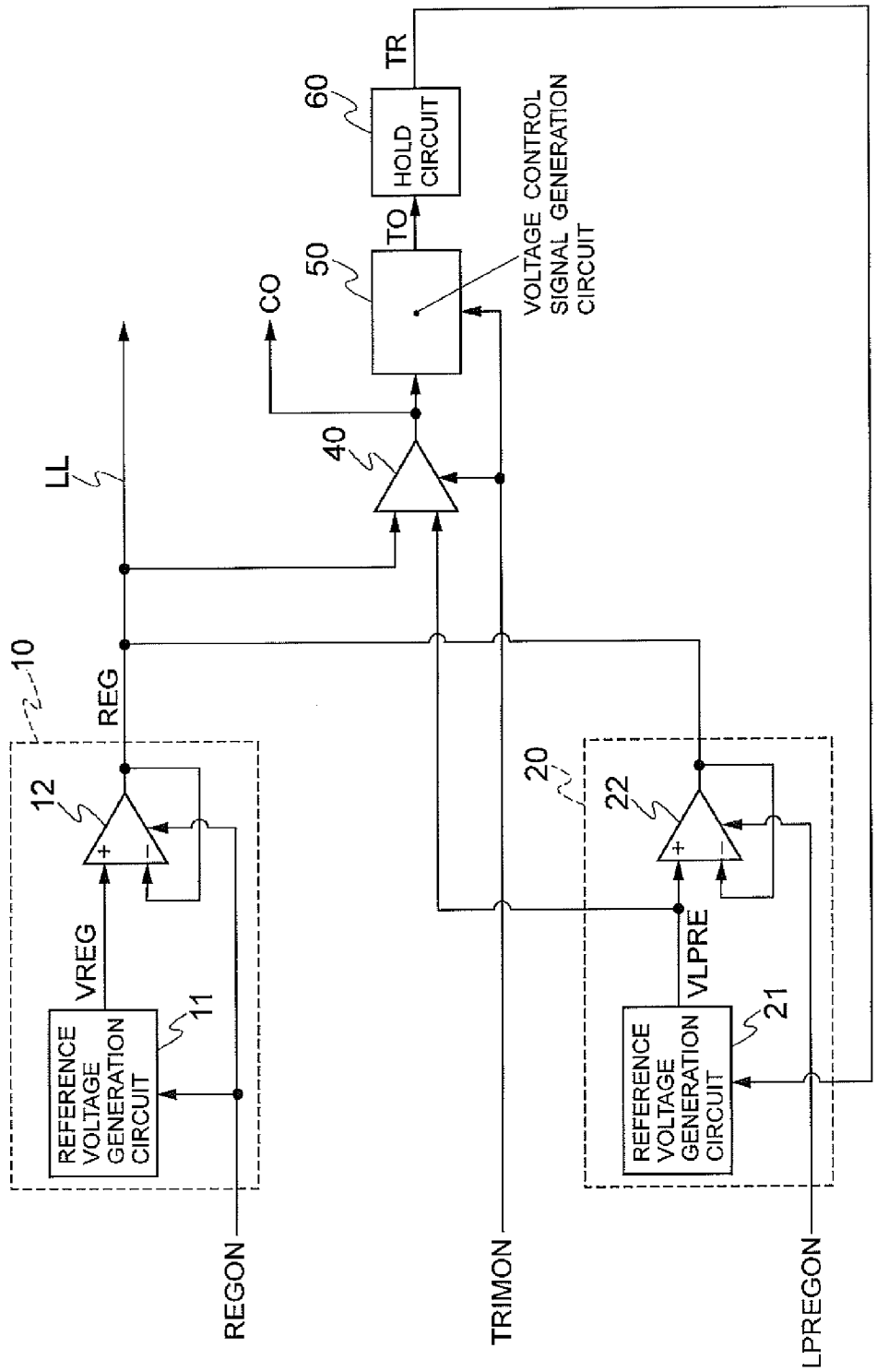
FIG. 20 is a block diagram illustrating a modified example of the constant-voltage power supplying part 4 shown in FIG. 18.

Furthermore, in the configuration shown in FIG. 18 or FIG. 19, the first the power supply line L1 and the second power supply line L2 are connected to each other through the switch 30. However, for example, as shown in FIG. 20, the switch 30 may be eliminated so that the first power supply line L1 and the second power supply line L2 are short-circuited. This configuration is simplified as compared with the configuration shown in FIG. 18 or FIG. 19 by the amount that the former does not include the sleep regulator activation signal LPREGON and the switch 30.

Furthermore, the constant-voltage power supplying part 4 shown in FIG. 18 or FIG. 19 provides activation/deactivation control only to the operational amplifier 22 of the sleep regulator 20 in response to the sleep regulator activation signal LPREGON. However, the activation/deactivation control may also be provided to the reference voltage generation circuit 21 of the sleep regulator 20 and the hold circuit 60.

Figure 21:
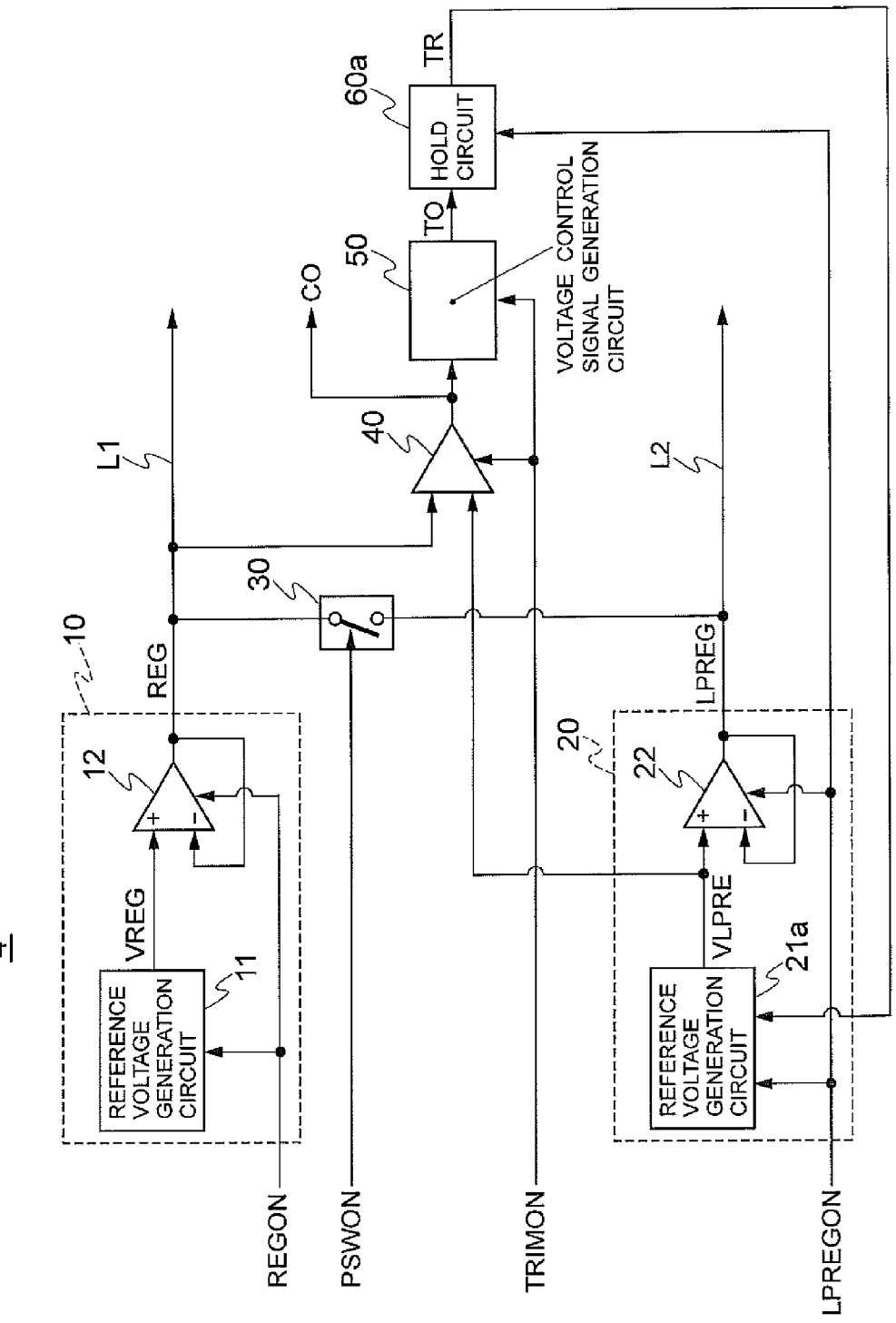
FIG. 21 is a block diagram illustrating a modified example of the constant-voltage power supplying part 4 shown in FIG. 18.

FIG. 21 is a block diagram illustrating a modified example of the constant-voltage power supplying part 4 shown in FIG. 18 and developed in view of the aforementioned point.

Note that the configuration shown in FIG. 21 is the same as that shown in FIG. 18 except that the reference voltage generation circuit 21*a* is employed in place of the reference voltage generation circuit 21 and the hold circuit 60*a* is employed in place of the hold circuit 60.

In FIG. 21, while the sleep regulator activation signal LPREGON is at logic level 1, the reference voltage generation circuit 21*a* is in an activated state and produces the second reference voltage VLPRE in the same manner as the reference voltage generation circuit 21. On the other hand, while the sleep regulator activation signal LPREGON is at logic level 0, the reference voltage generation circuit 21*a* is in a non-activated state and stops producing the second reference voltage VLPRE. While the sleep regulator activation signal LPREGON is at logic level 1, the hold circuit 60*a* is in an activated state and acquires and holds by overwriting the voltage control signal TO supplied from the voltage control signal generation circuit 50. The hold circuit 60*a* then supplies the voltage control signal TO being held to the reference voltage generation circuit 21*a* as the voltage control signal TR. On the other hand, while the sleep regulator activation signal LPREGON is at logic level 0, the hold circuit 60*a* is in a non-activated state and stops capturing the aforementioned voltage control signal TO.

Here, in the trim mode, the second reference voltage VLPREE produced in the reference voltage generation circuit 21*a* has to be supplied to the comparator 40. Thus, with the constant-voltage power supplying part 4 configured as shown in FIG. 21, the power supply management control part 2 turns the sleep regulator activation signal LPREGON to logic level 1 in the trim mode as shown in FIG. 11. Accordingly, in the trim mode, the sleep regulator 20 feeds the second supply voltage LPREG to the second power supply line L2 in response to the sleep regulator activation signal LPREGON at logic level 1. Thus, the switch 30 in an ON state would cause the first supply voltage REG and the second supply voltage LPREG to be superimposed on the first the power supply line L1, possibly leading to voltage variations in REG. In this context, as shown in FIG. 11, in the trim mode, the power supply management control part 2 supplies the power supply line coupling signal PSWON at logic level 0 to the switch 30, thereby turning OFF the same. Note that the fact that the output current capacity of the sleep regulator 20 is significantly lower than output current capacity of the active regulator 10 is substantially the same as that only the active regulator 10 supplies power. Accordingly, the switch 30 may be set to an ON state.

Furthermore, with the constant-voltage power supplying part 4 configured as shown in FIG. 18 or FIG. 19, when the second load 5 to which power is supplied during the sleep mode is resistant to power supply variations, the sleep regulator 20 may be normally placed in an activated state.

Figure 22:
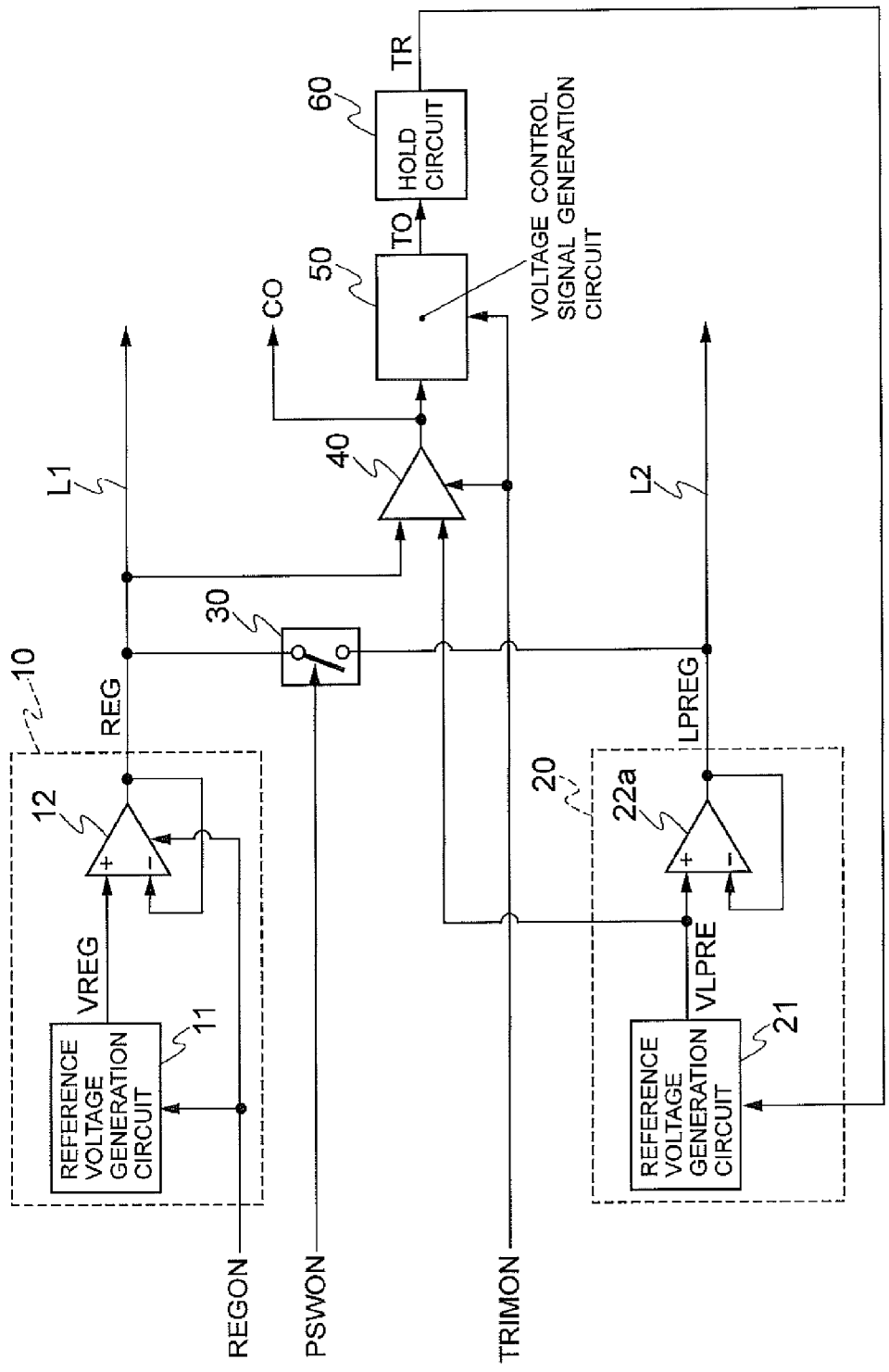
FIG. 22 is a block diagram illustrating a modified example of the constant-voltage power supplying part 4 shown in FIG. 18.

FIG. 22 is a block diagram illustrating a modified example of the constant-voltage power supplying part 4 shown in FIG. 18 and developed in view of the aforementioned point.

Note that the configuration shown in FIG. 22 is the same as that shown in FIG. 18 except that the operational amplifier 22a of the sleep regulator 20 is not controlled by the sleep regulator activation signal LPREGON for providing activation/deactivation control.

Figure 23:
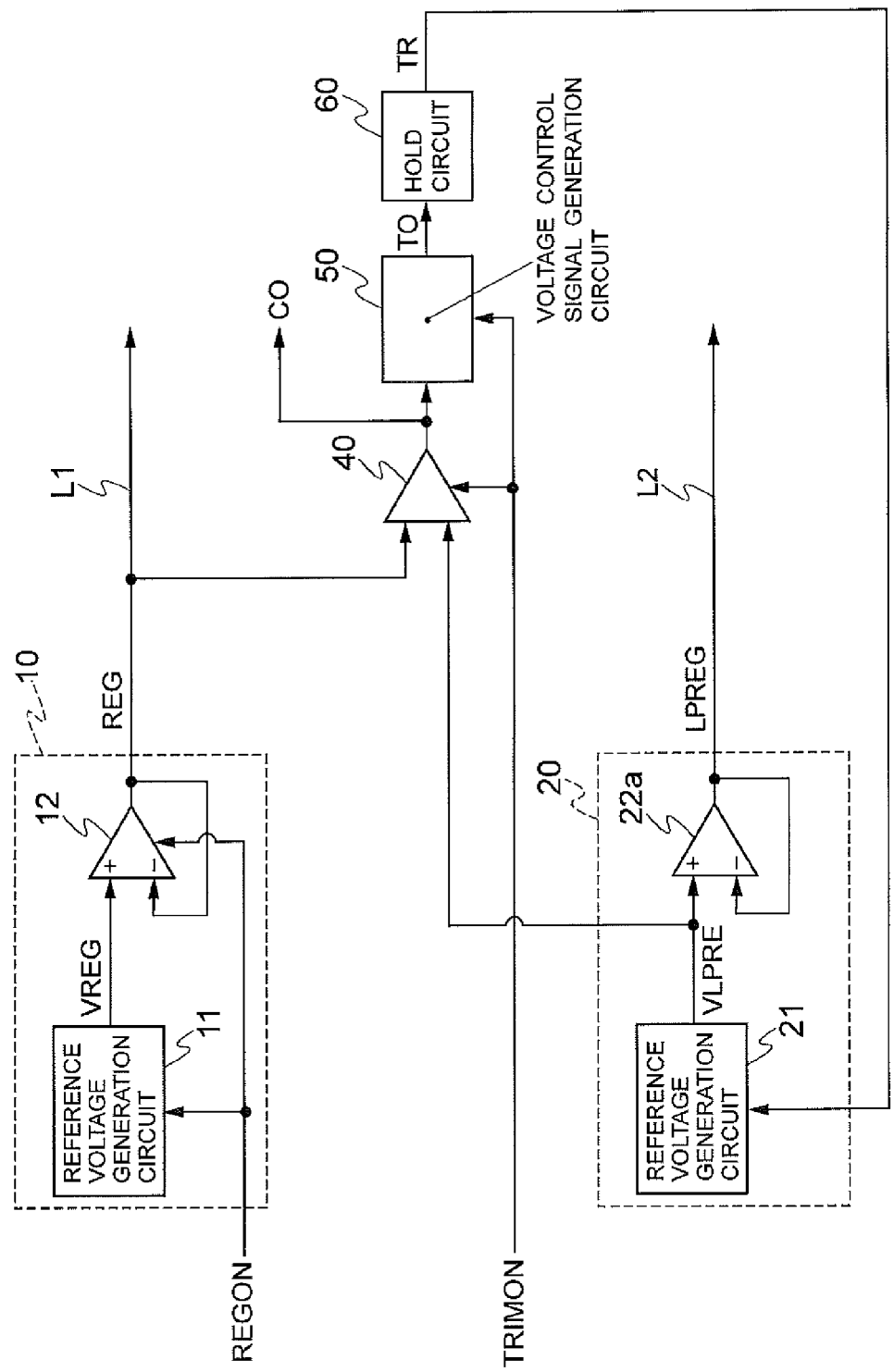
FIG. 23 is a block diagram illustrating a modified example of the constant-voltage power supplying part 4 shown in FIG. 18.

With the constant-voltage power supplying part 4 configured as shown in FIG. 22, the sleep regulator 20 is normally in an activated state. Thus, in the active mode and the trim mode, the first supply voltage REG and the second supply voltage LPREG are superimposed on the first the power supply line L1 and the second power supply line L2. In this context, in the active mode and the trim mode, the power supply management control part 2 supplies the power supply line coupling signal PSWON at logic level 0 to the constant-voltage power supplying part 4 configured as shown in FIG. 22. This allows the switch 30 to be turned into an OFF state, causing the power supply path (L1) of the active regulator 10 and the power supply path (L2) of the sleep regulator 20 to be isolated from each other. Here, the fact that the output current capacity of the sleep regulator 20 is significantly lower than the output current capacity of the active regulator 10 is substantially the same as that only the active regulator 10 supplies power. Accordingly, in this case, the switch 30 may be set to an ON state. Furthermore, during in the active mode, if the second load 5 operates in a normal condition with the power supplied only from the sleep regulator 20, then the switch 30 may be fixed to an OFF state. Or alternatively, as shown in FIG. 23, the switch 30 may be eliminated so that each of the first the power supply line L1 and the second power supply line L2 is normally in an independent state.

Furthermore, in the configurations shown in FIGS. 18 to 23, one of the voltage on the active regulator 10 side and the voltage on the sleep regulator 20 side between which the comparator 40 makes a comparison is the reference voltage (VREG, VLPRE). However, if the comparator 40 performs the comparison in consideration of the offset occurring in the output amplifier (12, 22, 22a) mounted on each regulator (10, 20), then both the voltages on the active regulator 10 side and the sleep regulator 20 side to be fed to the comparator 40 can be the reference voltage (VREG, VLPRE). For example, the comparator 40 performs a magnitude comparison between or determines the difference between the voltage value of the first reference voltage VREG and the voltage value obtained by adding the offset occurring in the operational amplifier 22 (22a) to the second reference voltage VLPRE, and then produces the comparison result signal CO indicative of the result. Furthermore, the comparator 40 performs a magnitude comparison between or determines the difference between the voltage value of the second reference voltage VLPRE and the voltage value obtained by adding the offset occurring in the operational amplifier 12 to the first reference voltage VREG, and then produces the comparison result signal CO indicative of the result.

Like the configuration shown in FIGS. 18 to 23, this configuration can provide high-speed control while eliminating the offset occurring in the output amplifier (12, 22, 22a) of the regulator (10, 20).

Furthermore, as shown in FIGS. 14 to 18 and FIGS. 20 to 23, the voltage on the active regulator 10 side to be employed for a comparison by the comparator 40 may be the first supply voltage REG. In this case, the active regulator 10a having the internal configuration as shown in FIG. 24 can also be employed in place of the active regulator 10.

Figure 24:
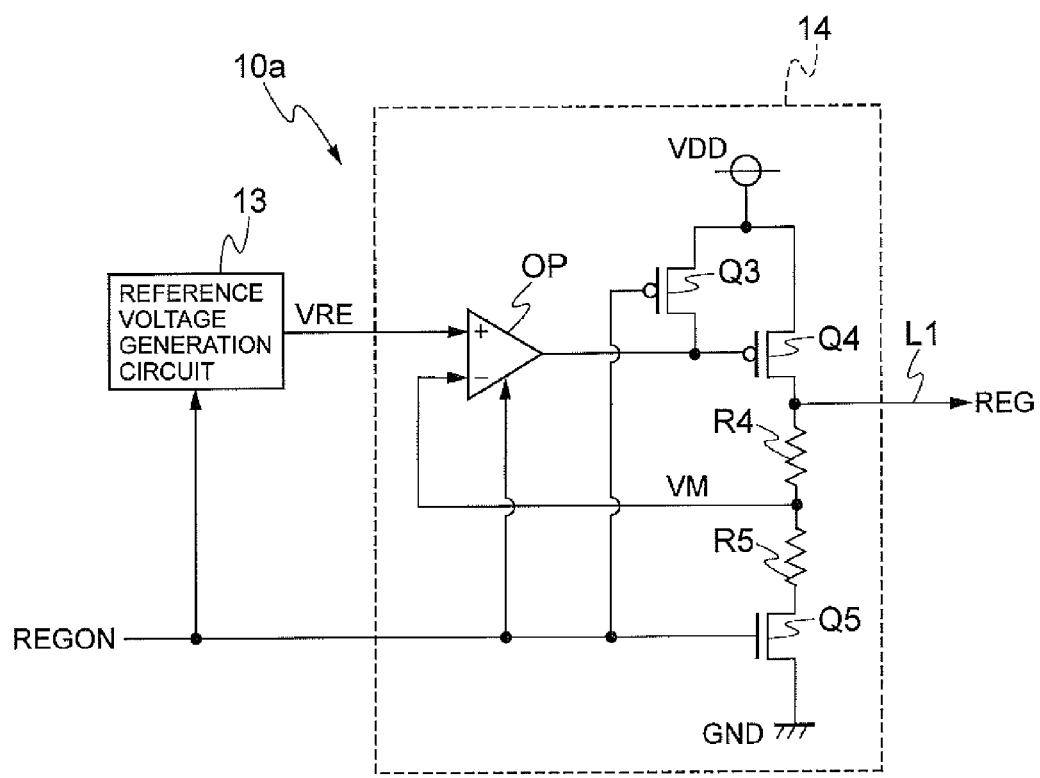
FIG. 24 is a circuit diagram illustrating another example of an active regulator 10.

The active regulator 10a shown in FIG. 24 has a reference voltage generation circuit 13 and a step-up circuit 14.

While the active regulator activation signal REGON is at logic level 1, the reference voltage generation circuit 13 is in an activated state and produces, on the basis of the battery voltage VDD, a reference voltage lower than the aforementioned first reference voltage VREG by a predetermined voltage value. The circuit 13 then supplies the resulting reference voltage as a first reference voltage VRE to the non-inverting input terminal of an operational amplifier OP of the step-up circuit 14.

The step-up circuit 14 includes the operational amplifier OP, p-channel MOS type transistors Q3 and Q4, resistors R4 and R5, and an n-channel MOS type transistor Q5. The output terminal of the operational amplifier OP is connected to the drain terminal of the transistor Q3 and the gate terminal of the transistor Q4. The source terminal of the transistor Q3 is applied with the battery voltage VDD, and the active regulator activation signal REGON is supplied to the gate terminal. The source terminal of the transistor Q4 is applied with the battery voltage VDD, and the drain terminal is connected with the first power supply line L1 and one end of the resistor R4. The other end of the resistor R4 is connected with one end of the resistor R5 and the inverting input terminal of the operational amplifier OP. The other end of the resistor R5 is connected with the drain terminal of the transistor Q5. A ground potential GND is applied to the source terminal of the transistor Q5, and the gate terminal is supplied with the active regulator activation signal REGON. In this configuration, when the active regulator activation signal REGON at logic level 1 is supplied, the operational amplifier OP is in an activated state and the transistor Q5 is in an ON state. Thus, a negative feedback voltage VM established at the connection point between the resistors R4 and R5 is supplied to the inverting input terminal of the operational amplifier OP. This allows the step-up circuit 14 to step up the voltage of the first reference voltage VRE supplied from the reference voltage generation circuit 13 by a predetermined voltage value, and then feed the resulting voltage as the first supply voltage REG to the first the power supply line L1.

As described above, by employing the active regulator 10a provided with the feedback-type step-up circuit 14 as the output stage as shown in FIG. 24, it is possible to supply power with improved stability when compared with the active regulator 10 which has a voltage follower as the output stage.

Note that when the active regulator 10a as shown in FIG. 24 is employed as an active regulator, the first reference voltage VRE fed from the reference voltage generation circuit 13 can be employed for a comparison by the comparator 40. At this time, since the voltage values of the first reference voltage VRE and the first supply voltage REG are different from each other, VRE cannot be directly supplied to the comparator 40. In this context, the step-up circuit for stepping up the first reference voltage VRE by the same amount as the aforementioned step-up circuit 14 does is disposed between the reference voltage generation circuit 13 and the comparator 40.

Figure 25:
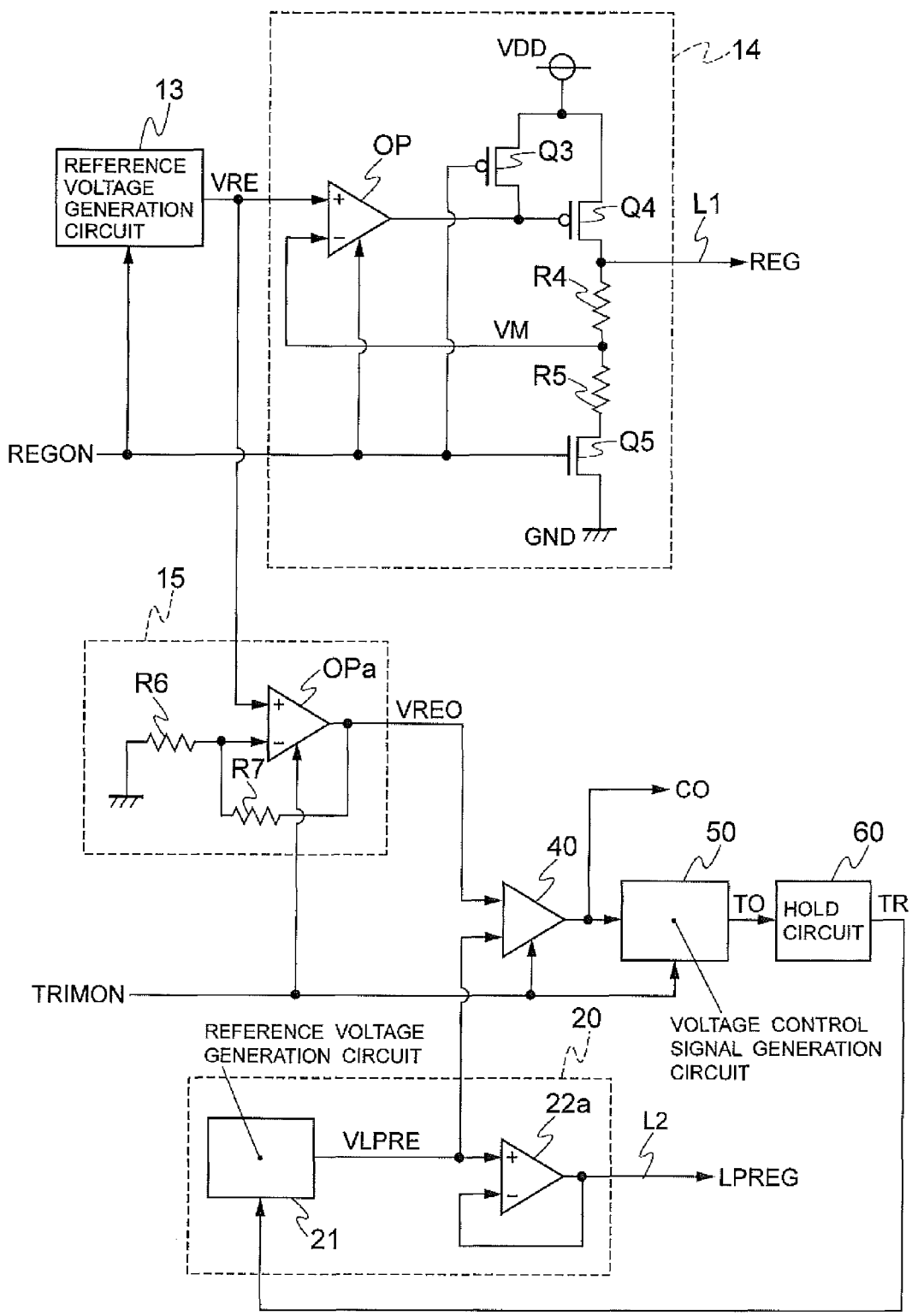
FIG. 25 is a block diagram illustrating a modified example of the constant-voltage power supplying part 4 shown in FIG. 23.

FIG. 25 is a view illustrating a modified example of the configuration of the constant-voltage power supplying part 4 shown in FIG. 23 and developed in view of the aforementioned point.

The constant-voltage power supplying part 4 shown in FIG. 25 is the same as that shown in FIG. 23 except that the active regulator 10a shown in FIG. 24 is employed in place of the active regulator 10, and the first reference voltage VRE fed from the reference voltage generation circuit 13 is supplied to the comparator 40 through a step-up circuit 15.

In FIG. 25, the step-up circuit 15 is a noninverting amplifier circuit which includes an operational amplifier OPa, a resistor R6, and a resistor R7. In the step-up circuit 15, the first reference voltage VRE fed from the reference voltage generation circuit 13 is stepped up with the same amplification factor as in the step-up circuit 14 and then supplied to the comparator 40 as a first reference voltage VREO. At this time, the resistors R4 and R5 of the step-up circuit 14 and the resistor R6 and R7 of the step-up circuit 15 are determined to satisfy the equation below:

$(R4/R5)=(R7/R6)$.

Note that the aforementioned configuration with the active regulator 10a and the step-up circuit 15 is also applicable to the constant-voltage power supplying part 4 shown not only in FIG. 23 but also in FIGS. 18, 20, 21, and 22.

Furthermore, the aforementioned embodiment employs the configuration shown in FIG. 5 as the reference voltage generation circuit 21 that is configured to reduce drive current for the purposes of achieving lower power consumption; however, the invention is not limited to such a configuration.

Figure 26:
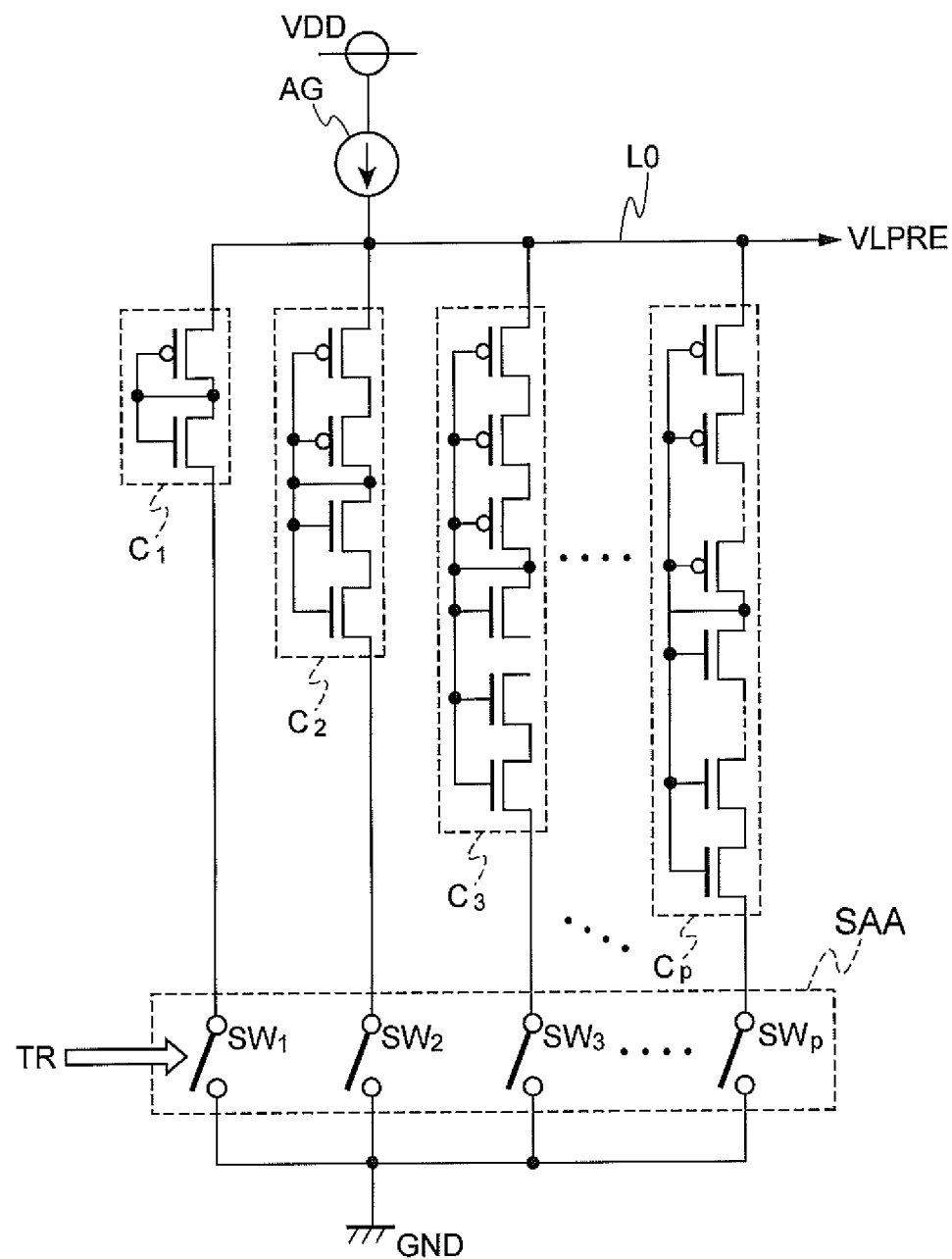
FIG. 26 is a circuit diagram illustrating another example of the internal configuration of a reference voltage generation circuit 21.

FIG. 26 is a circuit diagram illustrating another example of the reference voltage generation circuit 21.

In FIG. 26, the current source AG produces a constant current on the basis of the battery voltage VDD and then feeds the resulting current to the output line LO. Between the output line LO and a switch array SAA, there are provided, in parallel, current paths $C_1$ to $C_P$ (P is an integer equal to two or greater) in each of which an n-channel MOS type transistor and a p-channel MOS type transistor are connected in series in the manner as shown in FIG. 5. Each of the current paths $C_1$ to $C_P$ includes a different number of serially connected transistor stages, and thus each current path has a different electric resistance. The switch array SAA includes switch elements $SW_1$ to $SW_P$ which each connect individually between the ground line and each of the current paths $C_1$ to C. The switch array SAA sets one switch element SW of the switch elements $SW_1$ to $SW_P$ to an ON state in response to the voltage control signal TR and sets all the other switch elements SW to an OFF state. That is, in response to the voltage control signal TR, the switch array SAA selects from the current paths $C_1$ to $C_P$ a current path through which current is actually allowed to flow. At this time, since each of the current paths $C_1$ to $C_P$ has a different electric resistance, the voltage value of the output line LO established on the selected current path may vary. The voltage occurring on the output line LO is fed as the second reference voltage VLPRE.

Figure 27:
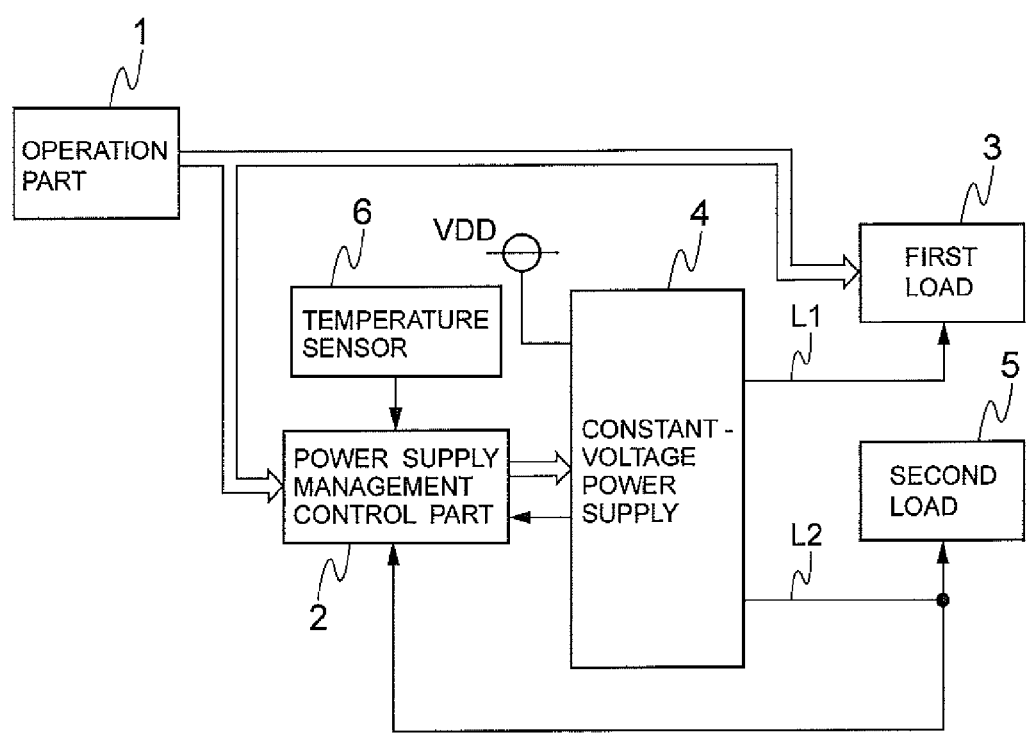
FIG. 27 is a block diagram illustrating another example of the internal configuration of an electronic apparatus.
Figure 28:
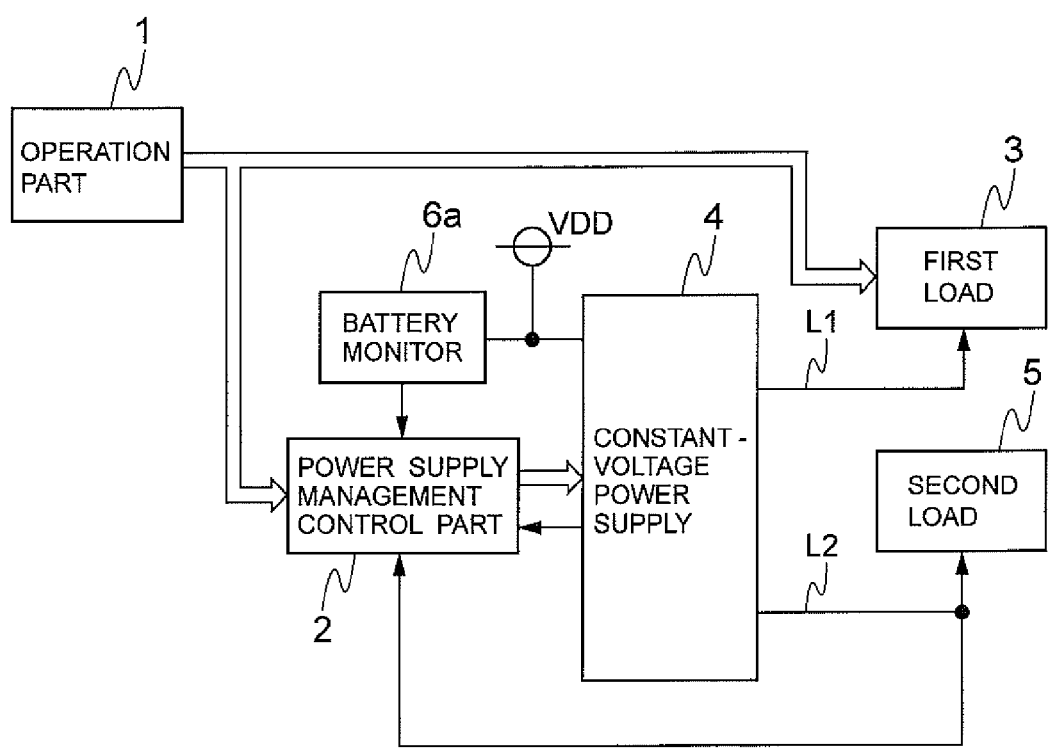
FIG. 28 is a block diagram illustrating another example of the internal configuration of an electronic apparatus.

Furthermore, as shown in FIG. 2 or FIG. 11, the aforementioned embodiment is configured to control the voltage of the sleep regulator 20 in the trimming mode when the sleep mode is changed to the active mode. However, the trimming mode may also be executed at arbitrary timing in response to the control input provided by the user on the operation part 1. Furthermore, as shown in FIG. 27, a temperature sensor 6 is provided for detecting ambient temperature. When the power supply management control part 2 determines that the temperature has changed by an amount greater than a predetermined change in temperature, that is, in an environment where the sleep regulator 20 tends to be subjected to temperature variations, the trimming mode may be forcedly executed. On the other hand, in place of the temperature sensor 6, it is also possible to employ such a configuration that includes a battery monitor 6a as shown in FIG. 28. The battery monitor 6a supplies a battery abnormality detection signal to the power supply management control part 2 when the battery voltage has changed by an amount greater than a predetermined amount of change. At this time, the power supply management control part 2 switches to execute the trimming mode in response to the battery abnormality detection signal.

Note that the aforementioned embodiment is configured to produce the voltage control signal (TO, TR) indicative of increasing or reducing the voltage value on the basis of the result of a magnitude comparison (CO) between the voltage (VREG, REG) produced in the active regulator 10 and the voltage (VLPRE, LPREG) produced in the sleep regulator 20. However, the invention is not limited to this configuration.

For example, in the trim mode, the difference in voltage value between the voltage (VREG, REG) produced in the active regulator 10 and the voltage (VLPRE, LPREG) produced in the sleep regulator 20 is determined. Then, produced is the voltage control signal (TO, TR) indicative of reducing or increasing the second reference voltage VLPRE by the voltage control value associated with the difference in voltage value. At this time, the reference voltage generation circuit 21 provides control so as to increase the second reference voltage VLPRE by the voltage control value when the voltage control signal indicates a negative value, whereas reducing the second reference voltage VLPRE by the voltage control value when the voltage control value has a positive polarity. Note that by holding such a voltage control signal in the hold circuit 60, the reference voltage generation circuit 21 produces, during the sleep mode, the second reference voltage VLPRE that is controlled on the basis of the voltage control value being held.

Figure 29:
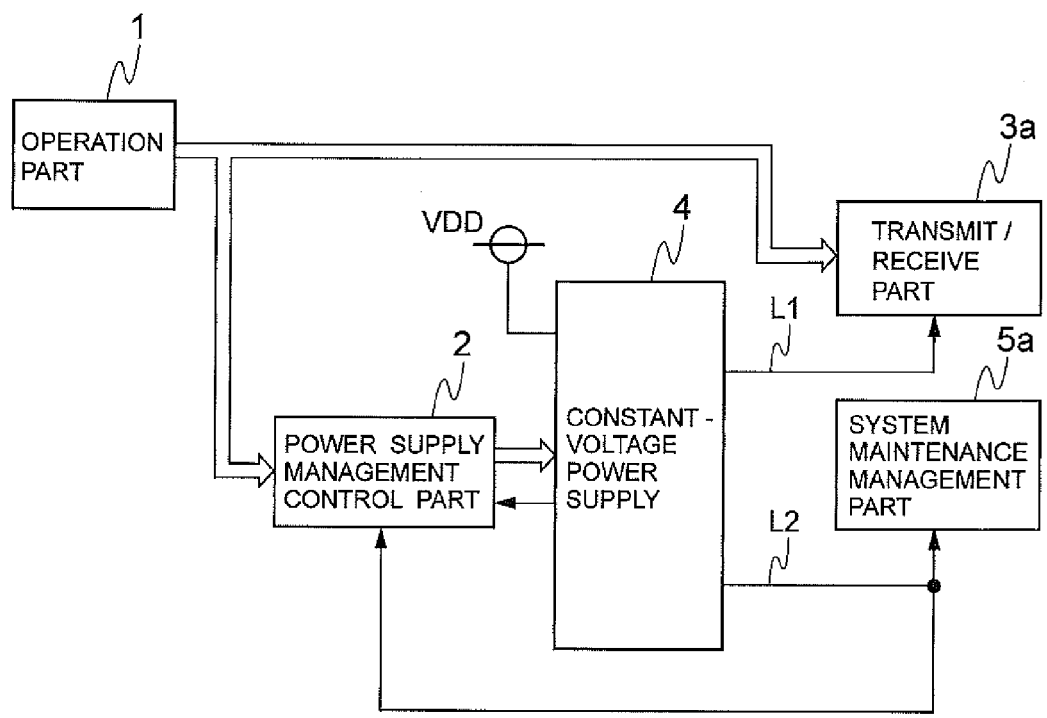
FIG. 29 is a block diagram illustrating the internal configuration of an electronic apparatus such as cellular phones or smartphones into which a power supply device according to the present invention is incorporated.

FIG. 29 is a block diagram illustrating the internal configuration of an electronic apparatus, or a communication device such as a cellular phone or smartphone, into which a power supply device according to the present invention is incorporated.

Note that the configuration of FIG. 29 is the same as that shown in FIG. 1 except that the aforementioned first load 3 is replaced with a transmit/receive part 3a and the aforementioned second load 5 is replaced with a system maintenance management part 5a. In this configuration, the constant-voltage power supplying part 4 has the internal configuration as shown in FIG. 3, 10, 12 to 19, 21 to 23, or 25, and during in the active mode, supplies the first supply voltage REG produced as described above to the transmit/receive part 3a through the first power supply line L1. At this time, in response to the first supply voltage REG being supplied, the transmit/receive part 3a is now capable of transmitting/receiving radio signals and making various settings related to transmit/receive operations, and performs various radio transmit/receive operations in response to a operation signal supplied from the operation part 1. Note that the constant-voltage power supplying part 4 stops supplying power to the aforementioned transmit/receive part 3a during the sleep mode in which the transmit/receive part 3a stops the transmit/receive operations.

Furthermore, the constant-voltage power supplying part 4 supplies one of the aforementioned first supply voltage REG and the aforementioned second supply voltage LPREG to the system maintenance management part 5a through the second power supply line L2 in response to the power supply line coupling signal PSWON. The system maintenance management part 5a includes, for example, a time measuring timer and an incoming mail processing circuit which should be kept operating even during the sleep mode. The system maintenance management part 5a is driven into an operable state in response to the first supply voltage REG or the second supply voltage LPREG being supplied. This configuration allows the constant-voltage power supplying part 4 to supply the aforementioned first supply voltage REG to both the transmit/receive part 3a and the system maintenance management part 5a in the active mode, whereas supplying the aforementioned second supply voltage LPREG to the system maintenance management part 5a in the sleep mode. At this time, in the sleep mode, the constant-voltage power supplying part 4 supplies no power to the transmit/receive part 3a.

This application is based on Japanese Patent Application No. 2011-270197 which is herein incorporated by reference.

What is claimed is:

1. A power supply device, comprising:
    a first power supplying part which produces a first voltage;
    a second power supplying part which produces a second voltage, the second power supplying part having an output current capacity smaller than the first power supplying part;
    a comparator for comparing a magnitude of the first voltage and a magnitude of the second voltage with each other; and
    voltage control signal generation means for generating a voltage control signal on the basis of the comparison, wherein
    the second power supplying part controls a voltage value of the second voltage so as to bring the voltage value of the second voltage closer to a voltage value of the first voltage in response to the voltage control signal.

2. The power supply device according to claim 1, wherein the voltage control signal generation means produces the voltage control signal on the basis of either a difference in voltage value between the first voltage and the second voltage, or a result of a magnitude comparison between the first voltage and the second voltage.

3. The power supply device according to claim 1, wherein the first power supplying part comprises
    a first reference voltage generation circuit for producing a first reference voltage, and
    a first output amplifier for producing, as a first supply voltage, such a voltage as to have a same voltage value as that of the first reference voltage, and then feeding the first supply voltage to a first power supply line;
    the second power supplying part comprises
    a second reference voltage generation circuit for producing a second reference voltage, and
    a second output amplifier for producing, as a second supply voltage, such a voltage as to have a same voltage value as that of the second reference voltage, and then feeding the second supply voltage to a second power supply line;
    the first voltage is the first reference voltage or the first supply voltage, while the second voltage is the second reference voltage or the second supply voltage; and
    the second reference voltage generation circuit controls a voltage value of the second reference voltage in response to the voltage control signal.

4. The power supply device according to claim 3, wherein the first reference voltage generation circuit comprises a negative feedback amplification circuit and supplies, as the first reference voltage, an output voltage of the negative feedback amplification circuit to the first output amplifier; and
    the second reference voltage generation circuit comprises a plurality of transistors connected in series between an output line and a ground line and a current source for feeding current to the plurality of transistors through the output line, and supplies a voltage on the output line to the second output amplifier as the second reference voltage.

5. The power supply device according to claim 3, further comprising a switch which connects or interrupts connection between the first power supply line and the second power supply line, and wherein
    the first power supplying part is switchable to either one of states including an activated state in which the first supply voltage is produced in response to an activation signal and a non-activated state in which the first supply voltage is stopped from being produced.

6. The power supply device according to claim 3, further comprising a hold circuit for holding the voltage control signal, and wherein
    the second reference voltage generation circuit controls the voltage value of the second voltage in response to the voltage control signal held by the hold circuit.

7. The power supply device according to claim 6, wherein the hold circuit is brought into a driven state when supplied with the second supply voltage.

8. The power supply device according to claim 3, wherein the first voltage is the first supply voltage, and the second voltage is the second reference voltage.

9. The power supply device according to claim 3, wherein the first voltage is the first reference voltage, and the second voltage is the second supply voltage.

10. The power supply device according to claim 3, wherein
    the voltage control signal generation means produces the voltage control signal on the basis of either a difference between the first reference voltage and an offset added voltage obtained by adding an offset occurring in the second output amplifier to the second reference voltage, or a result of a magnitude comparison between the first reference voltage and the offset added voltage.

11. The power supply device according to claim 3, wherein
    the voltage control signal generation means produces the voltage control signal on the basis of either a difference between the second reference voltage and an offset added voltage obtained by adding an offset occurring in the first output amplifier to the first reference voltage, or a result of a magnitude comparison between the second reference voltage and the offset added voltage.

12. A method for controlling a power supply device, the power supply device including a first power supplying part for producing a first voltage, and a second power supplying part for producing a second voltage and having an output current capacity smaller than the first power supplying part, the method comprising:
    comparing a magnitude of the first voltage and a magnitude of the second voltage with each other; and
    providing control so that a voltage value of the second voltage is brought closer to a voltage value of the first voltage.

13. The method for controlling a power supply device according to claim 12, wherein
    the first power supplying part supplies power to a first load, and functions to produce the first voltage while maintaining an activated state during an active mode in which the first load is in an operating state, and maintain stoppage of generation of the first voltage during a sleep mode in which the first load is in a stopped state.

14. The method for controlling a power supply device according to claim 13, wherein the voltage value of the second voltage is controlled during the active mode.

15. The method for controlling a power supply device according to claim 13, wherein control is provided to the voltage value of the second voltage after the first power supplying part is activated and immediately before the active mode.

16. The method for controlling a power supply device according to claim 13, wherein
in the active mode, a radio signal is transmitted or received, and a setting of the transmission or reception is made;
in the sleep mode, the transmission or reception is stopped; and
control is provided to the voltage value of the second voltage when the first power supplying part is in the activated state so as to avoid a period in which the transmission or reception is performed.

17. An electronic apparatus including an active mode in which a first load is in an operating state and a sleep mode in which the first load is at a stopped state, the electronic apparatus comprising:
a first power supplying part which produces a first voltage and supplies power to the first load while maintaining an activated state during the active mode, and stops producing the first voltage during the sleep mode and stopping supplying power to the first load;
a second power supplying part which produces a second voltage and supplies power to a second load, the second power supplying part having an output current capacity smaller than the first power supplying part;
a comparator for comparing a magnitude of the first voltage and a magnitude of the second voltage with each other; and
voltage control signal generation means for generating a voltage control signal on the basis of a result of the comparison, wherein
the second power supplying part controls a voltage value of the second voltage so as to bring the voltage value of the second voltage closer to a voltage value of the first voltage in response to the voltage control signal.

18. The electronic apparatus according to claim 17, comprising a transmit/receive part for providing control of transmission or reception of a radio signal during the active mode, and wherein
the first power supplying part comprising
a first reference voltage generation circuit for producing a first reference voltage, and
a first output amplifier for producing a first supply voltage having a same voltage value as that of the first reference voltage, and then supplying the first supply voltage through a first power supply line to the transmit/receive part;
the second power supplying part comprising
a second reference voltage generation circuit for producing a second reference voltage, and
a second output amplifier for producing a second supply voltage having a same voltage value as that of the second reference voltage, and then feeding the second supply voltage through a second power supply line to the second load; and
the first voltage is the first reference voltage or the first supply voltage, while the second voltage is the second reference voltage.

* * * * *